(12) United States Patent
Wu

(10) Patent No.: US 10,888,935 B1
(45) Date of Patent: Jan. 12, 2021

(54) KEY DUPLICATING MACHINE

(71) Applicant: Kuo-Shen Wu, Taipei (TW)

(72) Inventor: Kuo-Shen Wu, Taipei (TW)

( * ) Notice: Subject to any disclaimer, the term of this patent is extended or adjusted under 35 U.S.C. 154(b) by 0 days.

(21) Appl. No.: 16/507,145

(22) Filed: Jul. 10, 2019

(51) Int. Cl.
*B23C 3/35* (2006.01)

(52) U.S. Cl.
CPC ............ *B23C 3/35* (2013.01); *B23C 2235/48* (2013.01); *Y10T 409/301064* (2015.01)

(58) Field of Classification Search
CPC ....... B23C 3/35; B23C 3/355; B23C 2235/48; Y10T 409/301064; Y10T 409/300952
See application file for complete search history.

(56) References Cited

U.S. PATENT DOCUMENTS

| | | | | |
|---|---|---|---|---|
| 866,418 A * | 9/1907 | Bardwell | ................... | B23C 3/35 409/81 |
| 1,565,047 A * | 12/1925 | Biondi | ....................... | B23C 3/35 409/81 |
| 1,803,428 A * | 5/1931 | Falk | ........................... | B23C 3/35 409/81 |
| 2,098,728 A * | 11/1937 | McPhee | ..................... | B23C 3/35 409/81 |
| 2,757,578 A * | 8/1956 | Saucedo | .................... | B23C 3/35 409/82 |
| 3,286,596 A * | 11/1966 | Lieptz | ....................... | B23C 3/35 409/83 |
| 3,469,498 A * | 9/1969 | Adler | ........................ | B23C 3/35 409/82 |
| 4,325,662 A * | 4/1982 | Evans | ....................... | B23C 3/35 279/155 |
| 5,122,018 A * | 6/1992 | Zion | ......................... | B23C 3/35 409/81 |
| 5,244,321 A * | 9/1993 | Sopko | ....................... | B23C 3/35 409/82 |
| 5,441,369 A * | 8/1995 | Foscan | ...................... | B23C 3/35 409/81 |

FOREIGN PATENT DOCUMENTS

| | | | | |
|---|---|---|---|---|
| DE | 2166055 A1 * | 2/1973 | ............... | B23C 3/35 |
| FR | 1532689 A * | 7/1968 | ............... | B23C 3/35 |
| GB | 191406579 A * | 11/1914 | ............... | B23C 3/35 |
| GB | 1262406 A * | 2/1972 | ............... | B23C 3/35 |

* cited by examiner

*Primary Examiner* — Ryan C Rufo
(74) *Attorney, Agent, or Firm* — Bacon & Thomas, PLLC

(57) ABSTRACT

A key duplicating machine is used for duplicating notches of an original key to a key blank. The key duplicating machine includes a base assembly, a first sliding table, a first driving mechanism, a first clamp, a second clamp and a cutting module. The first sliding table is slidably mounted on the base assembly. The first driving mechanism controls a position of the first sliding table. The two clamps are fixed on the base assembly. The original key and key blank are fixed on the two clamps respectively. The cutting module is pivotally mounted on the first sliding table, and has a guiding element, a cutting element and a motor. Gravity makes the cutting module rotate, and makes the guiding element and the cutting element press against the keys. The duplicating can be carried out with one hand, which is easier to use and more precise.

7 Claims, 24 Drawing Sheets

KEY DUPLICATING MACHINE

BACKGROUND OF THE INVENTION

1. Field of the Invention

The present invention relates to a cutting machine tool, especially to a key duplicating machine.

2. Description of the Prior Arts

With reference to FIGS. 23 and 24, a conventional key duplicating machine can be used for duplicating shapes of notches on a side of a key. The key duplicating machine comprises a base assembly 91 and a swing table 92. The swing table 92 is pivotally mounted on a pivot shaft 911 of the base assembly 91 and is linearly movable along the pivot shaft 911. A first clamp 921 and a second clamp 922 are fixed on a top of the swing table 92. The base assembly 91 has a cutting element 912, a motor 913 and a guiding element 914. The motor 913 rotates the cutting element 912. A shape of a tip of the guiding element 914 is same as a shape of the edge of the cutting element 912, and a distance between the guiding element 914 and the cutting element 912 is equal to a distance between the first clamp 921 and second clamp 922.

When using the key duplicating machine, an original key 93 to be duplicated and a key blank 94 are clamped respectively by the first clamp 921 and the second clamp 922 (as shown in FIG. 23), and then the swing table 92 is pushed towards the guiding element 914, which makes one of the notches on a side of the original key 93 abut against the tip of the guiding element 914. Meanwhile, a side of the key blank 94 contacts the edge of the cutting element 912 and is cut by the cutting element 912, thereby making a notch in the same shape as one of the notches on the original key 93 formed on the key blank 94 by the cutting element 912 (as shown in FIG. 23). Then, the swing table 92 is moved linearly along an axial direction of the pivot shaft 911 to make the guiding element 914 pass all the notches on the side of the original key 93, which makes the cutting element 912 cut and duplicate all notches from the original key 92 to the key blank 94.

Since the function of the swing table 92 is merely to provide a fixation for the two keys (the original key 93 and the key blank 94) and to make the two keys move together relative to the base assembly 91, the swing table 92 is light-weighted and most of the weight of a conventional key duplicating machine falls on the base assembly 91. Among all components of the base assembly 91, the motor 913 is a major source of weight.

However, the conventional key duplicating machine has the following shortcomings.

First, the keys are fixed on the swing table 92, but the swing table 92 is not fixed but pivotable and movable, and therefore a cutting force affects positions of the keys, and results in deviations of depths and positions of the duplicated notches. The deviations are gradually accumulated through each duplication process, and finally cause a failed duplicated key. For example, a key number one is duplicated from the original key 92, and then a key number two is duplicated from the key number one, but the key number two is likely to fail due to the accumulated deviations.

Second, when duplicating a key, the user needs to control movements of the swing table 92 in two different directions simultaneously, which makes it more difficult to use. To be precise, in order to duplicate all the notches from the side of the original key 93, the user needs to push the cutting element 912 towards the swing table 92 to control the depth of the notch, and meanwhile the other hand of the user needs to push the swing table 92 along the axial direction of the pivot shaft 911 to control the positions where the cutting element 912 cuts, which makes it difficult to use.

To overcome the shortcomings, the present invention provides a key duplicating machine to mitigate or obviate the aforementioned problems.

SUMMARY OF THE INVENTION

The main objective of the present invention is to provide a key duplicating machine wherein keys are fixed on a base assembly of the key duplicating machine, and a motor, a guiding element and a cutting element of the key duplicating machine are pivotal and movable for duplicating the keys, which improves accuracy of duplication and ease in use.

The key duplicating machine used for duplicating notches of an original key to a key blank comprises a base assembly, a first clamp, a second clamp, a first sliding table, a first driving mechanism and a cutting module. The base assembly has a base, a first direction and a second direction. The second direction is opposite to the first direction. The first clamp is fixed on the base of the base assembly for clamping the original key. The notches of the original key are arranged in the first direction. The second clamp is fixed on the base of the base assembly and disposed apart from the first clamp. The second clamp is used for clamping the key blank. The first sliding table is slidably mounted on the base assembly and is movable along the first direction or the second direction relative to the base assembly. The first sliding table is located next to the first clamp and the second clamp along the second direction. The first driving mechanism is mounted between the base assembly and the first sliding table, and drives the first sliding table to move relative to the base assembly. The first driving mechanism has a first manual operating part. The cutting module is pivotally mounted on the first sliding table. The cutting module has a swing table, a guiding element, a cutting element and a motor. The swing table is pivotally mounted on the first sliding table. The guiding element is fixed on the swing table and protrudes from a side, which is directed towards the first direction, of the swing table. The guiding element corresponds in position to the original key. The cutting element is rotatably mounted on the swing table and protrudes from the side, which is directed towards the first direction, of the swing table. The cutting element corresponds in position to the key blank. The motor is fixed on the swing table and drives the cutting element to rotate. A center of gravity of the cutting module is located between the second clamp and a pivoting axis of the cutting module such that the cutting module rotates in a direction in which the guiding element and the cutting element move towards a top surface of the first sliding table, thereby making the guiding element selectively abut against one of the notches of the original key. When the guiding element abuts against one of the notches of the original key, the cutting element cuts the key blank.

When using the present invention, fix the original key and the key blank respectively on the two clamps, and then move the first sliding table to make the guiding element on the cutting module abut against one of the notches of the original key. Meanwhile, the user operates the first driving mechanism to make the guiding element slide along all notches of the original key. The duplication of key is finished after the guiding element has slide-passed all notches of the original key, which makes the cutting element that moves together with the guiding element cut and duplicate all notches on the side of the key blank.

The advantages of the present invention are as follows.

First, the keys are clamped on the first clamp and the second clamp, and both clamps are fixed on the base. Therefore, the reaction force from key cutting can hardly affect the position of the keys, and the precision of key duplication is improved. Moreover, the weight of the cutting module is significantly greater than that of the conventional swing table because the cutting module has a motor, a cutting element and a guiding element. The increased weight reduces the effect of the reaction force from key cutting and stabilizes the position of the guiding element and the cutting element, which further improves the precision of duplication.

Second, a cutting depth of the cutting element is automatically controlled by the weight of the cutting module pressing against the guiding element and the cutting element, and therefore when duplicating a key, the user only has to control the position where the cutting element cuts by operating the first driving mechanism with one hand. The first driving mechanism moves the guiding element and the cutting element along the first direction or the second direction and completes the duplication. The present invention is easier to use and faster in duplication.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
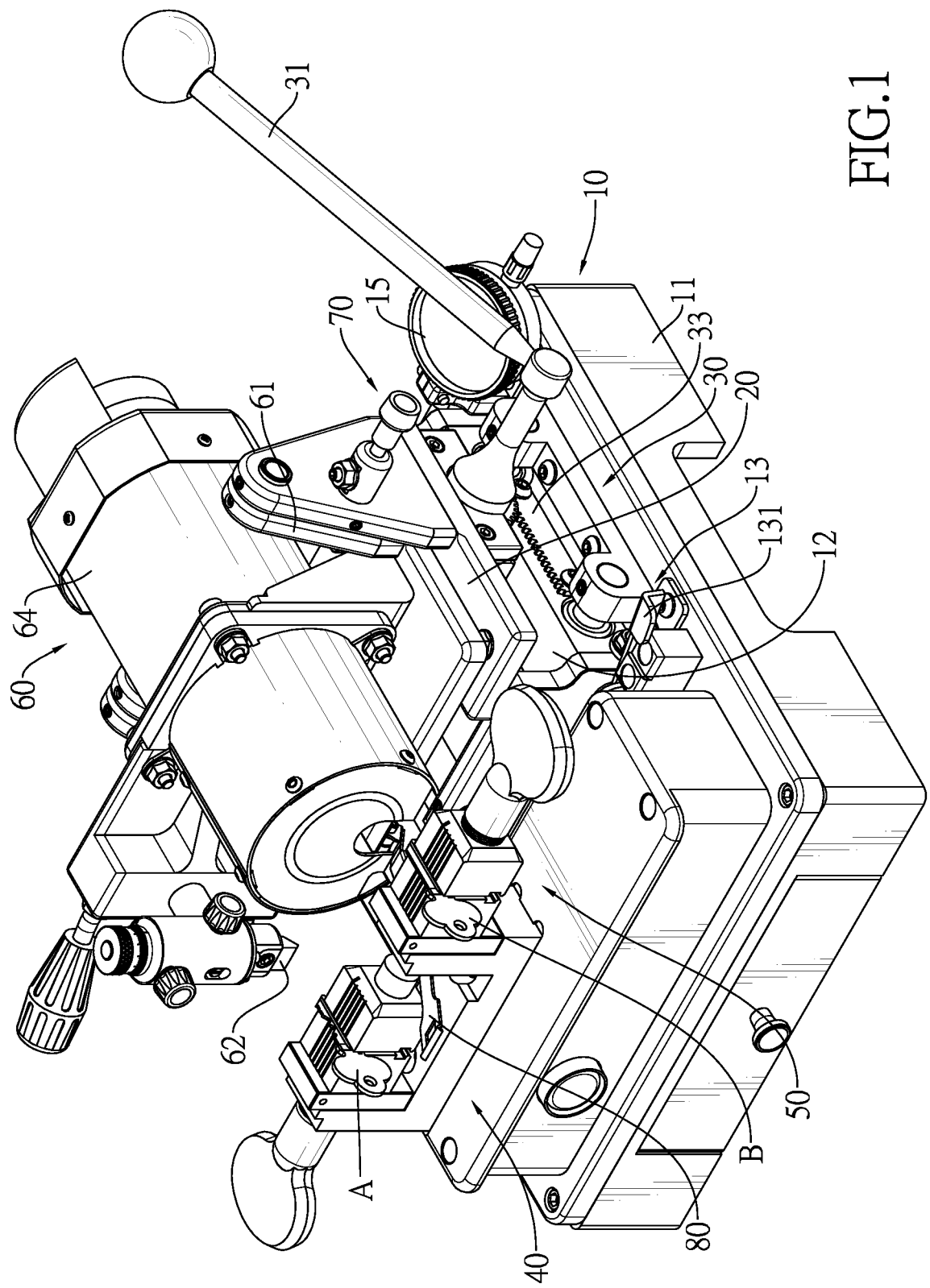
FIG. 1 is a perspective view of a key duplicating machine in accordance with the present invention.

With reference to FIGS. 1 to 4, a key duplicating machine in accordance with the present invention comprises a base assembly 10, a first sliding table 20, a first driving mechanism 30, a first clamp 40, a second clamp 50 and a cutting module 60. In a preferred embodiment, the present invention further comprises an angular fixing mechanism 70 and a pry bar 80.

Figure 3:
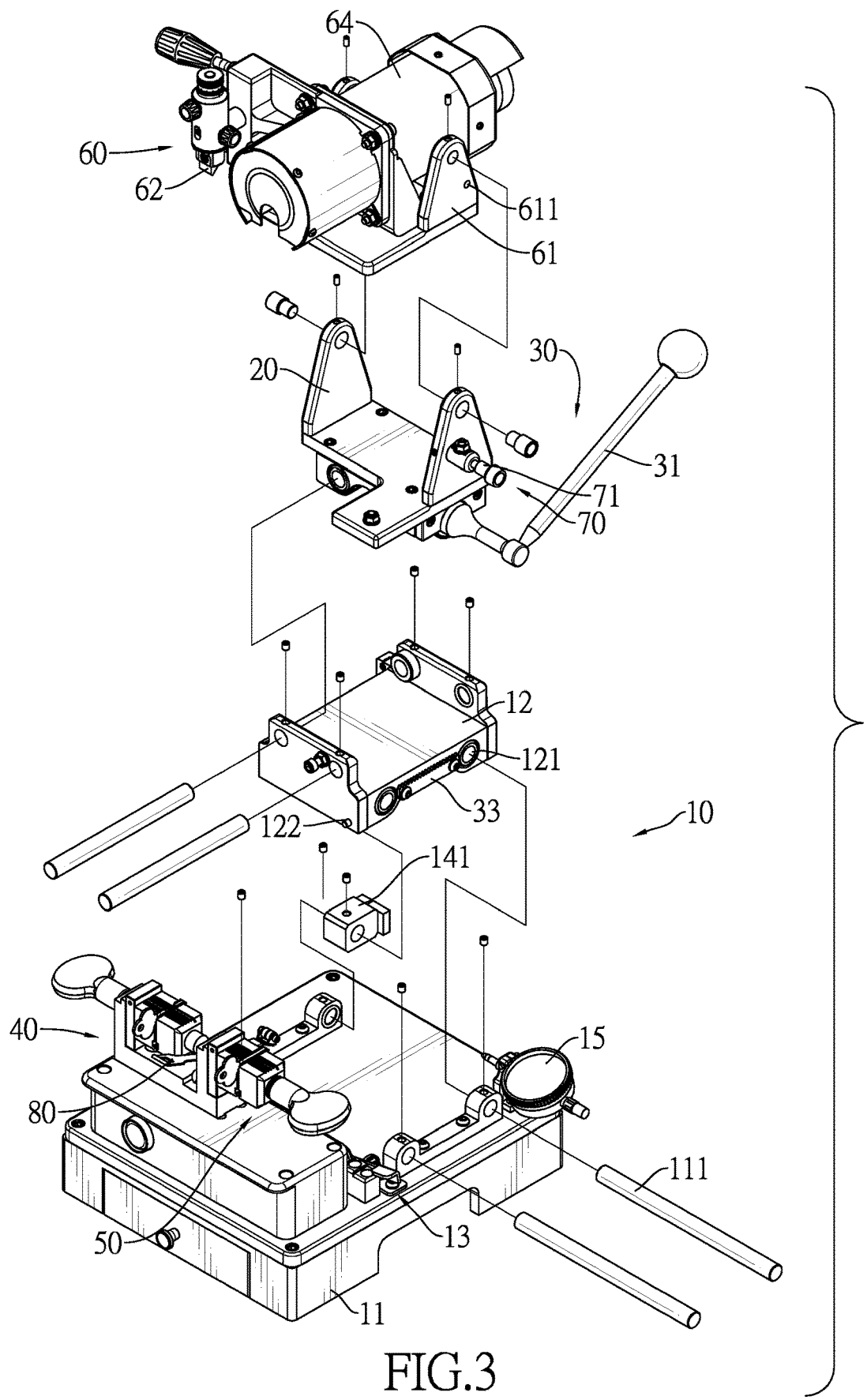
FIG. 3 is an exploded view of the key duplicating machine in FIG. 1.
Figure 4:
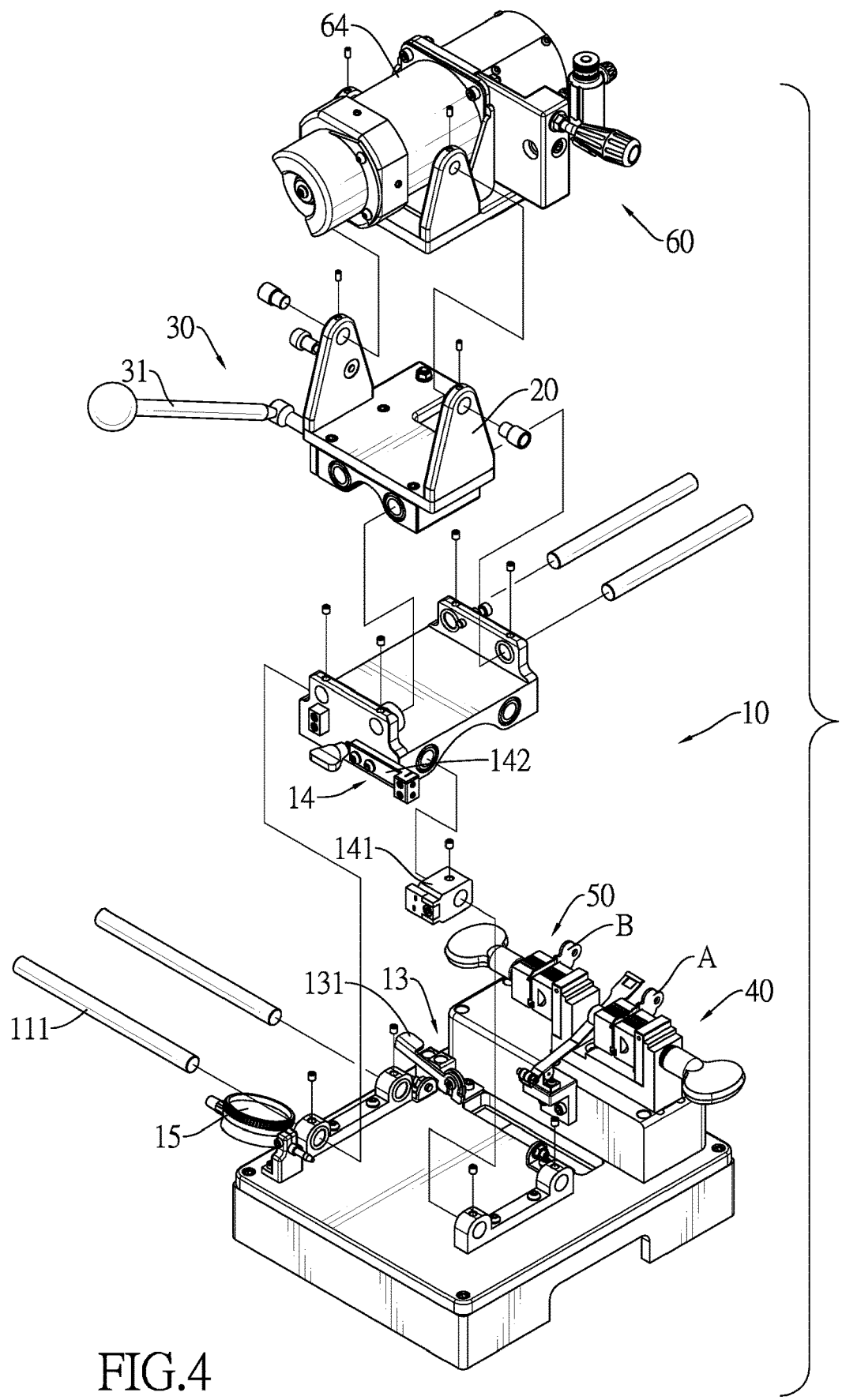
FIG. 4 is another exploded view of the key duplicating machine in FIG. 1.

With reference to FIGS. 3 and 4, the base assembly 10 has a base 11, and in a preferred embodiment, the base assembly 10 further has a second sliding table 12, a second driving mechanism 13, a switching mechanism 14 and a distance indicator 15.

With reference to FIGS. 2, 3, 5 and 6, the base assembly 10 has a first direction D1 and a second direction D2. The first direction D1 and the second direction D2 are opposite to each other. The second sliding table 12 is slidably mounted on the base 11, and is movable in a direction perpendicular to the first direction D1 and the second direction D2. In a preferred embodiment, the base 11 has two guide rods 111. The guide rods 111 are parallel to each other, and are fixed on a top of the base 11. The guide rods 11 are slidably mounted through guide holes 121 formed in opposite walls of the second sliding table 12, which makes the second sliding table 12 able to slide sideways relative to the base 11. However, the mechanism which makes the second sliding table 12 slidable relative to the base 11 is not limited to the abovementioned. In a preferred embodiment, a dowel pin 122 protrudes from one side of the second sliding table 12, and the dowel pin 122 extends along the first direction D1.

With reference to FIGS. 1, 4, 14 and 15, the second driving mechanism 13 is used to control a relative movement between the second sliding table 12 and the base 11. The second driving mechanism 13 is mounted between the base 11 and the second sliding table 12, and drives the second sliding table 12 to move relative to the base 11. The second driving mechanism 13 has a second manual operating part 131. In a preferred embodiment, the second manual operating part 131 is a lever pivotally mounted on the base 11. The pivot of the second manual operating part 131 is a pivot shaft 133, and the pivot shaft 133 is located above the dowel pin 122. A drive slot 132 is formed on an end of the lever where the lever is pivotally mounted on the base 11. The drive slot 132 is located around the dowel pin 122. When a user presses or lifts the lever, the lever pivots relative to the base 11, and the dowel pin 122 is driven by the drive slot 132 and makes the dowel pin 122 move in a direction perpendicular to the first direction D1 (in a preferred embodiment, said direction being an extending direction along a pivoting axis L1 mentioned later). The movement of the dowel pin 122 makes the second sliding table 12 move sideways relative to the base 11. In another preferred embodiment, the pivot shaft 133 can be located under the dowel pin 122, as long as a height of the dowel pin 122 is different from a height of the pivot shaft 133, which transforms a pivoting of the lever into sideways movement of the dowel pin 122. In still another embodiment, the drive slot 132 is a curved slot, and therefore the pivot shaft 133 can be located on a side of the dowel pin 122, which means the pivot shaft 133 and the dowel pin 122 can be at the same height. In this case the pivoting of the lever can still be transformed into sideways movement of the second sliding table 12.

Figure 2:
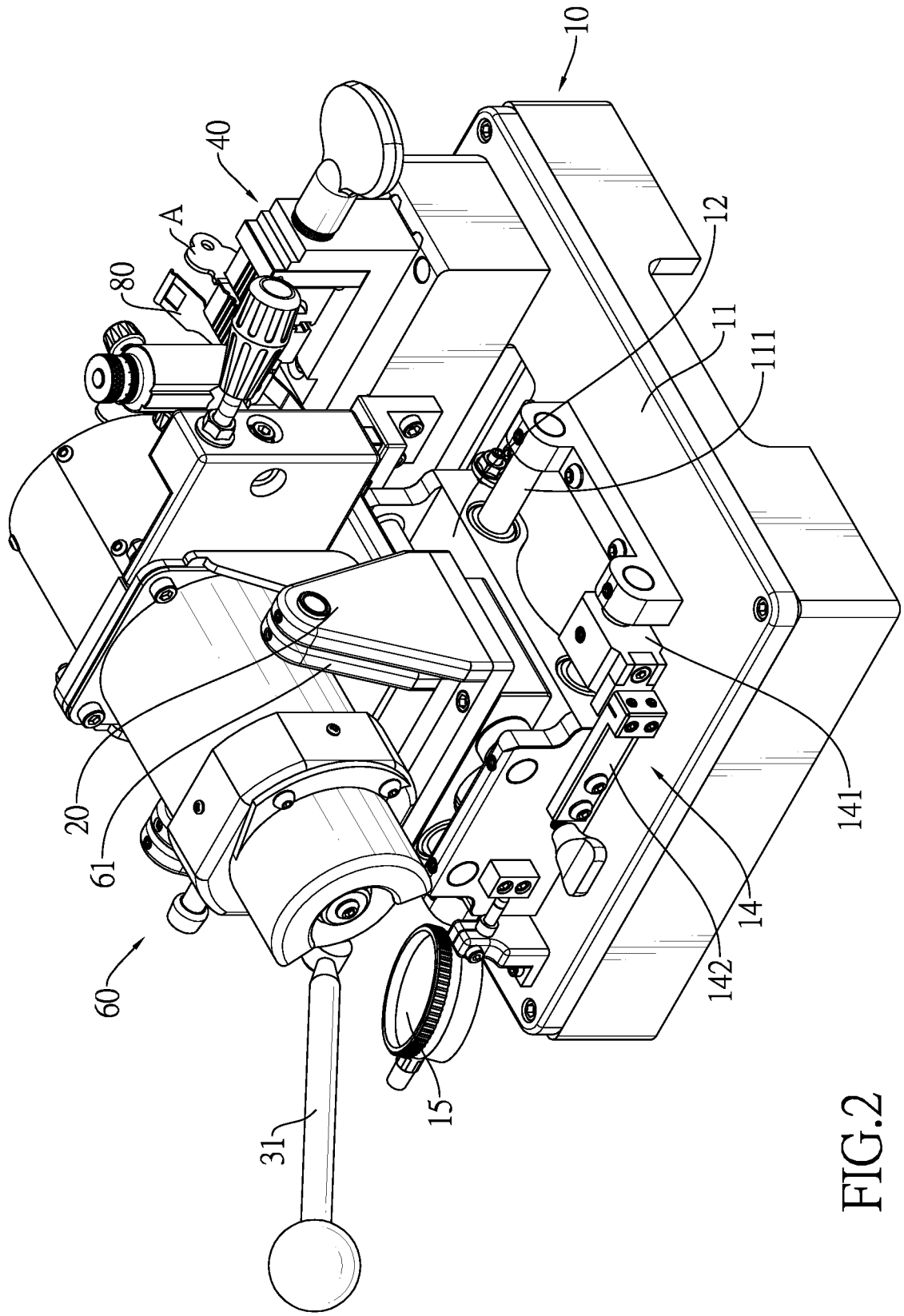
FIG. 2 is another perspective view of the key duplicating machine in FIG. 1.
Figure 16:
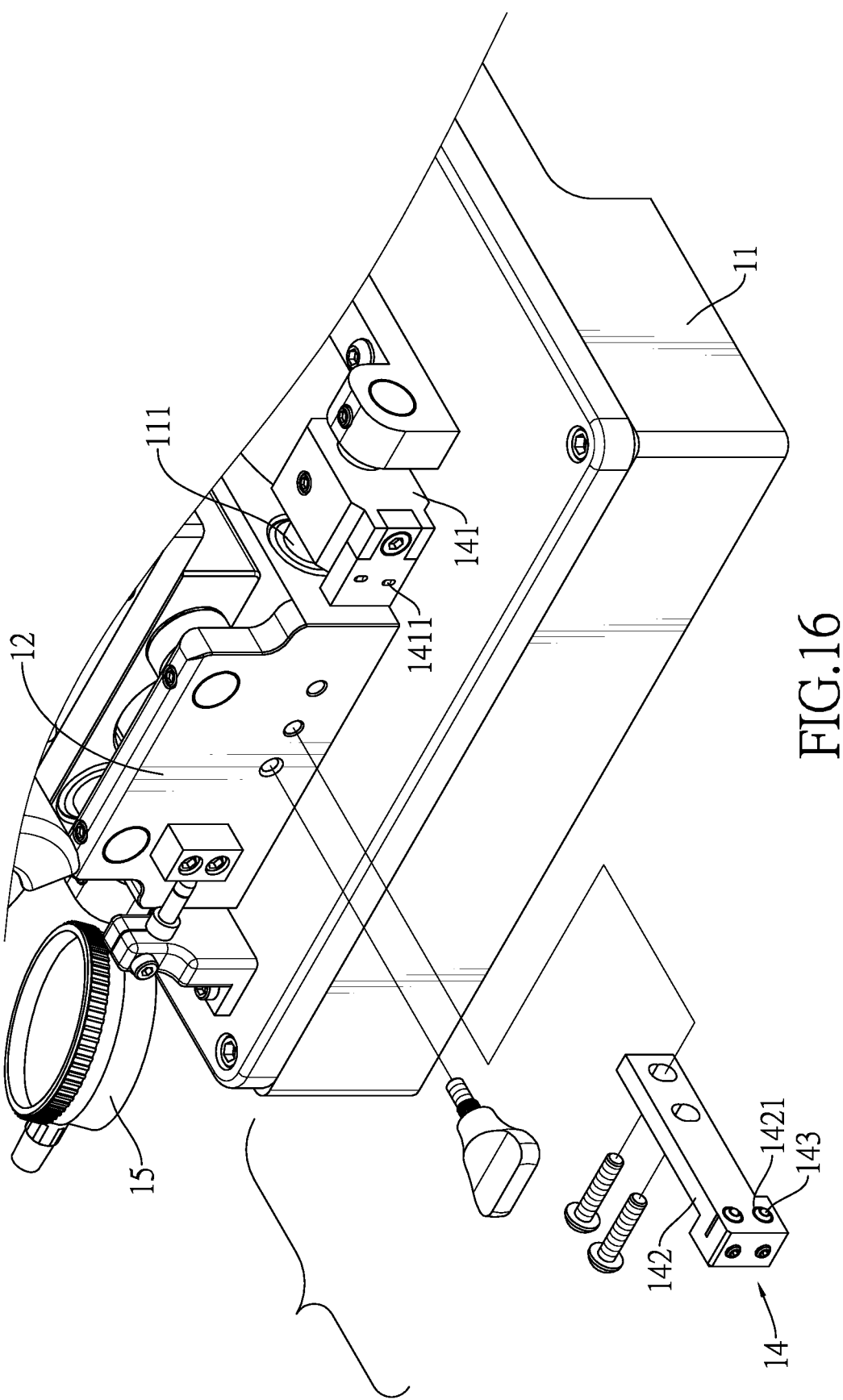
FIG. 16 is another exploded view of part of the components of the key duplicating machine in FIG. 1.

With reference to FIGS. 2 and 16, the switching mechanism 14 is mounted between the base 11 and the second sliding table 12. The switching mechanism 14 has a fixed block 141, a switching block 142, two first positioning balls 143 and two first resilient elements.

Figure 17:
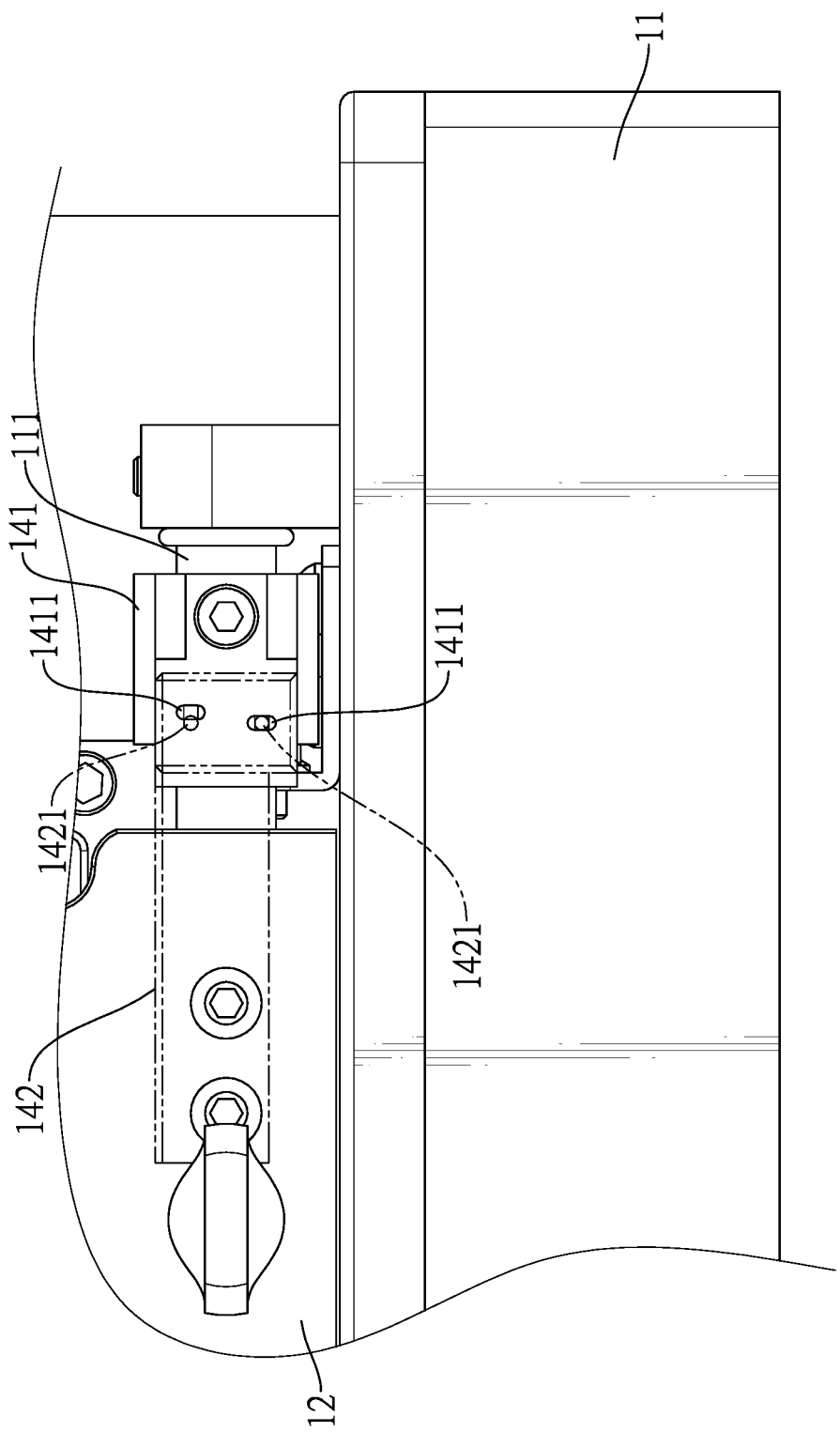
FIG. 17 is a rear view in partial section of the key duplicating machine in FIG. 1.

With reference to FIGS. 16 and 17, the fixed block 141 is mounted on the base 11. To be precise, a through hole is formed through the fixed block 141, and the through hole of the fixed block 141 is slidably located around one of the guide rods 111. A set screw is mounted in the fixed block 141 and abuts against the guide rod 111. Using the set screw, the fixed block 141 can be fixed on multiple locations on the base 11. Two positioning recesses 1411 are formed on the fixed block 141 and vertically disposed apart from each other.

The switching block 142 is fixed on the second sliding table 12. Two mounting holes 1421 are formed in the switching block 142, and heights of the two mounting holes 1421 are same to the heights of the two positioning recesses 1411 respectively. The two mounting holes 1421 are disposed apart along a direction perpendicular to the first direction D1, which means a distance between the two mounting holes 1421 along the direction perpendicular to the first direction D1 is different from a distance between the two positioning recesses 1411 along the direction perpendicular to the first direction D1. As a result, the two mounting holes 1421 do not align with the two positioning recesses 1411 simultaneously.

The two first positioning balls 143 are mounted in the two mounting holes 1421 respectively, and correspond in position to the two positioning recesses 1411 respectively. When one of the mounting holes 1421 align with one of the positioning recesses 1411, the first positioning ball 143 inside said mounting hole 1421 is mounted in said positioning recess 1411.

The two resilient elements (not shown in FIGS.) are mounted in the two mounting holes 1421 respectively, and push the two first positioning balls 143 towards the two positioning recesses 1411, which makes the positioning balls 143 automatically mounted in the corresponding positioning recess 1411 when the mounting hole 1421 aligns with the positioning recess 1411.

Figure 18:
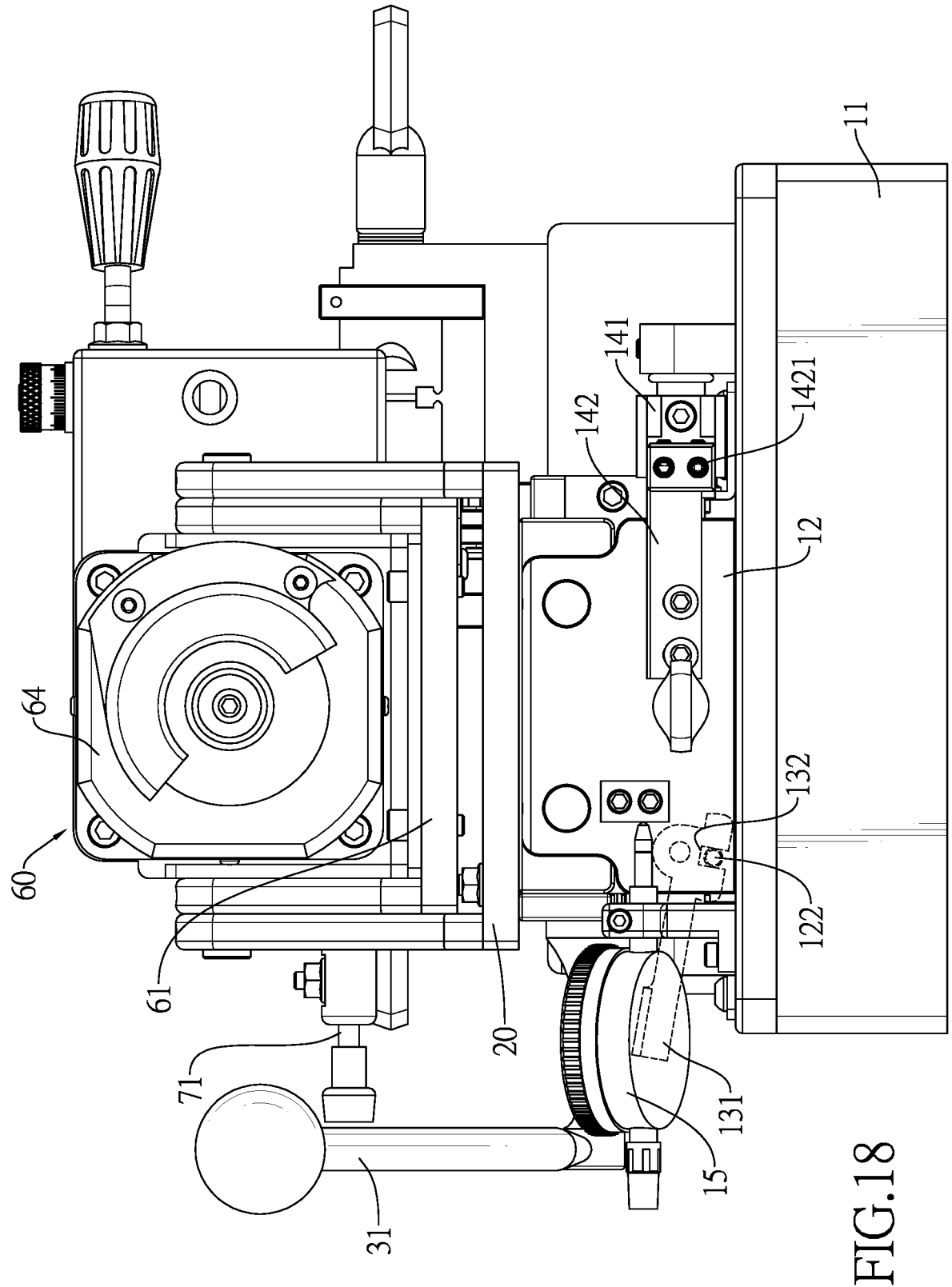
FIGS. 18 and 19 are rear views of the key duplicating machine in FIG. 1, showing different statuses of the second driving mechanism and a switching mechanism of the key duplicating machine.
Figure 19:
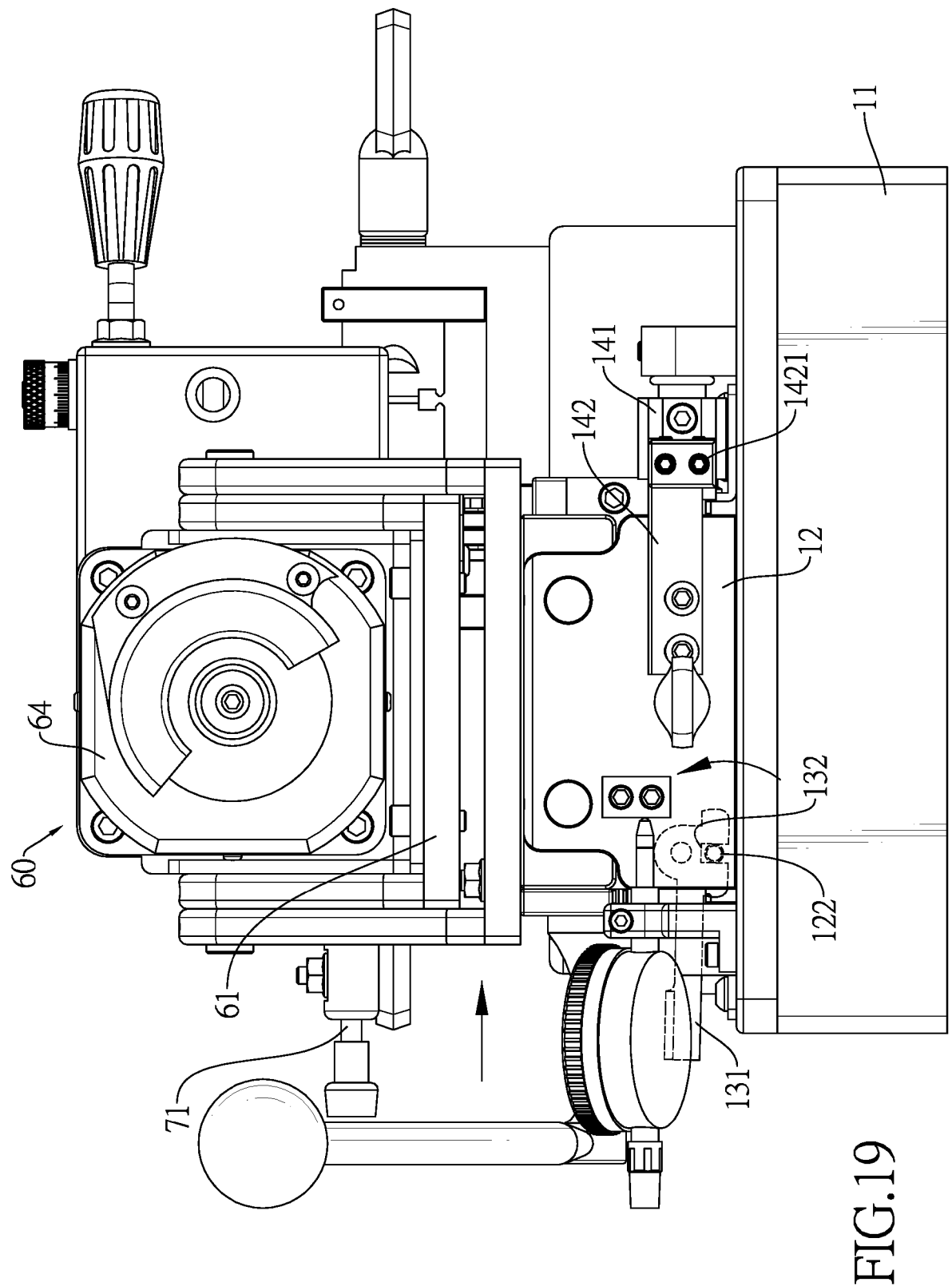

With reference to FIGS. 17, 18 and 19, the function of the switching mechanism 14 is to provide two stopping positions during the travel of the second sliding table 12 relative to the base 11. To be specific, when the second sliding table 12 is in one of the two stopping positions, one of the two mounting holes 1421 aligns with the corresponding positioning recess 1411, and the corresponding first positioning ball 143 is automatically mounted in the positioning recess 1411 and fixes the second sliding table 12 in said stopping position. Because the first positioning balls 143 are driven by the resilient elements, the first positioning balls 143 can be forced out of the positioning recesses 1411 when the user moves the second sliding table 12 manually with a relatively larger force, and therefore, the position of the second sliding table 12 can be switched quickly between the two stopping positions.

Besides, by having the two mounting holes 1421, the two positioning balls 143 and the two positioning recesses 1411 correspond in position with each other, the distance between the two positioning recesses 1411 does not have to be same as a distance between the two stopping positions, which is especially useful when the distance between the two stopping positions is very short. For example, when the distance between the two stopping positions is merely 0.6 mm, the two positioning recesses 1411 can still maintain a proper distance to keep the two positioning recesses 1411 from communicating with each other and losing the positioning function. Finally, because a position of the fixed block 141 relative to the base 11 can be adjusted, the two stopping positions can also be adjusted along with the position of the fixed block 141. With reference to FIGS. 2 and 18, the distance indicator 15 is mounted between the base 11 and the second sliding table 12. The positions of the second sliding table 12 and the base 11 relative to each other are measured and displayed on the distance indicator 15.

Figure 5:
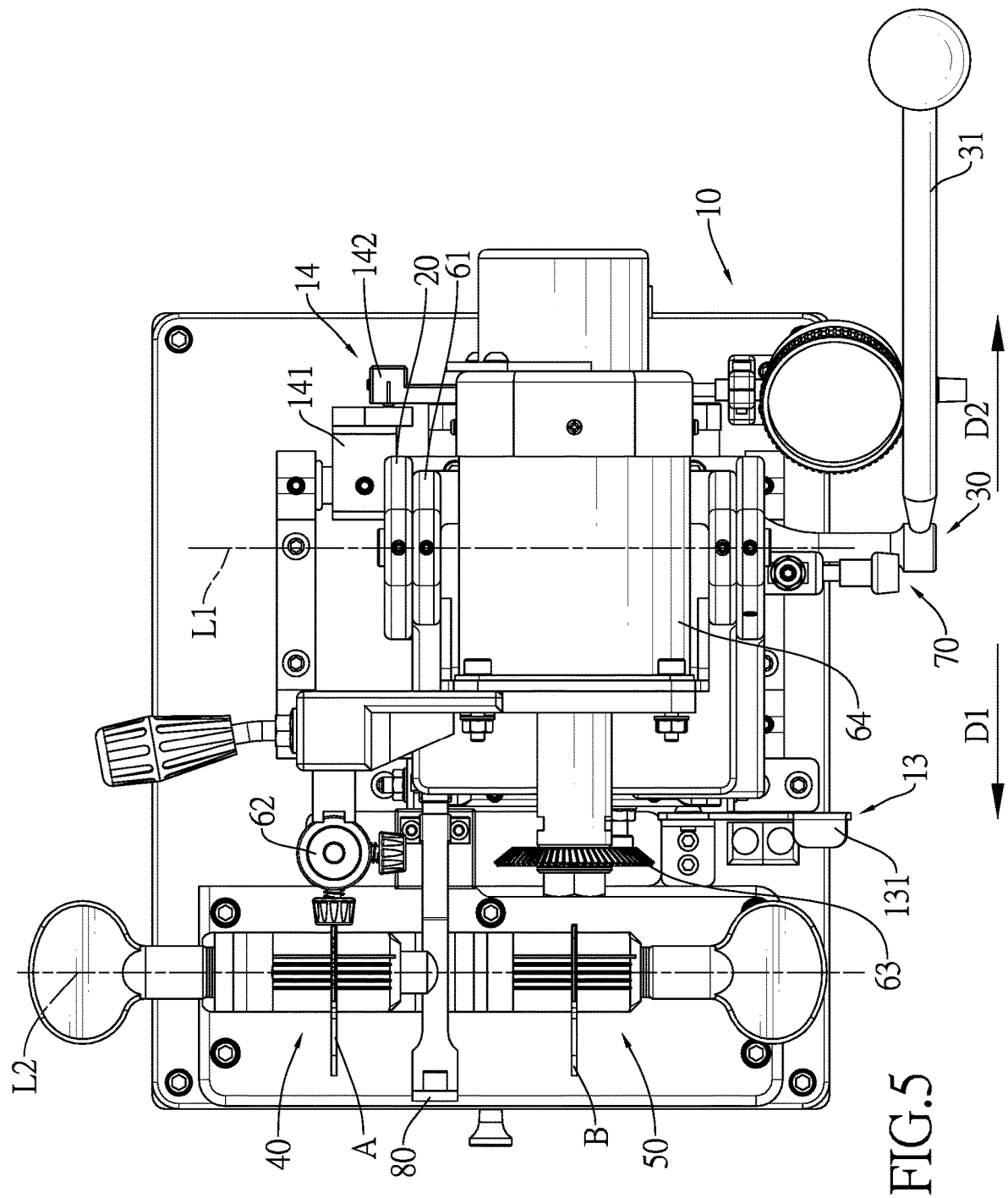
FIG. 5 is a top view of the key duplicating machine in FIG. 1.

With reference to FIGS. 1, 3 and 5, the first sliding table 20 is slidably mounted on the base assembly 10, and is movable along the first direction or the second direction relative to the base assembly 10. In a preferred embodiment, the first sliding table 20 is mounted on the second sliding table 12 of the base assembly 10, and is movable along the first direction D1 or the second direction D2 relative to the second sliding table 12.

In another preferred embodiment, a size of the first sliding table 20 can be larger than a size of the second sliding table 12, and a position of the first sliding table 20 and a position of the second sliding table 12 can be exchanged, which means the second sliding table 12 can be slidably mounted on the first sliding table 20. Meanwhile, both the second driving mechanism 13 and the switching mechanism 14 can be mounted between the first sliding table 20 and the second sliding table 12 for controlling the sideways movement of the second sliding table 12. In still another preferred embodiment, the second sliding table 12 can be omitted, and the first sliding table 20 can be mounted directly on the base 11 to reduce structural complexity.

Figure 6:
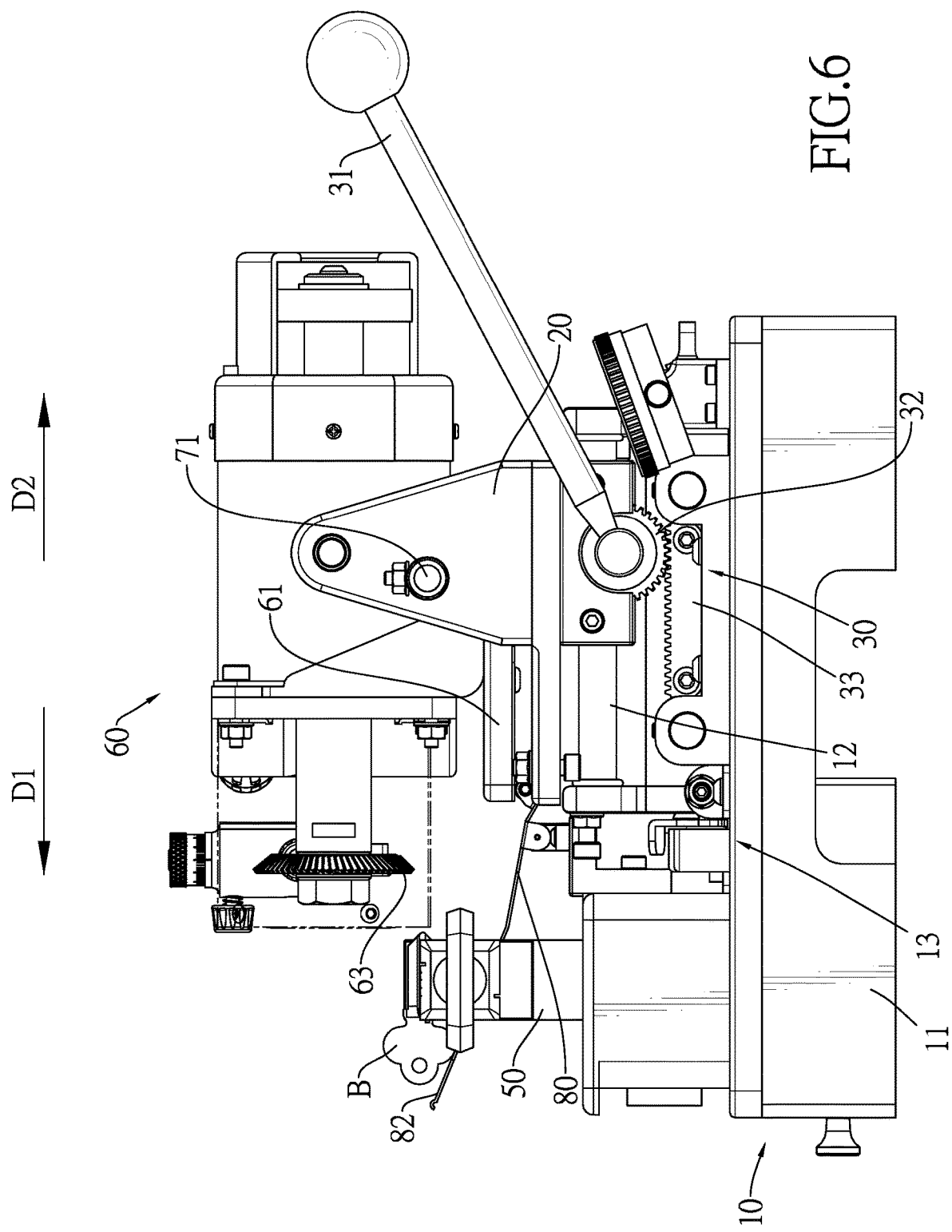
FIG. 6 is a side view of the key duplicating machine in FIG. 1.

With reference to FIGS. 1, 3 and 6, the first driving mechanism 30 is mounted between the base assembly 10 and the first sliding table 20, and drives the first sliding table 20 to move relative to the base assembly 10. The first driving mechanism 30 has a first manual operating part 31. In a preferred embodiment, the first manual operating part 31 is a rod, and the rod is pivotally mounted on the first sliding table 20. The first driving mechanism 30 further has a gear 32 and a gear rack 33. The gear 32 is fixed on the first manual operating part 31, and the gear rack 33 is fixed on the second sliding table 12 of the base assembly 10 and engages with the gear 32. When the rod is rotated, the gear 32 rotates together with the rod and produces a relative movement between the gear 32 and the gear rack 33, thereby determining positions of the first sliding table 20 and the base assembly 10 relative to each other by a pivoting angle of the rod. When the user moves the rod backwards and forwards, the first driving mechanism 30 drives the first sliding table 20 to move backwards and forwards accordingly. The structure of the first driving mechanism 30 is not limited by the abovementioned, as long as the user can make the first sliding table 20 move relative to the base assembly 10 by operating the first manual operating part 31.

With reference to FIGS. 1, 4, 5 and 6, the first clamp 40 and the second clamp 50 are fixed on the base 11 of the base assembly 10. The first clamp 40 and the second clamp 50 are located next to the first sliding table 20 along the first direction D1. The first clamp 40 is used for clamping the original key A, and makes the notches A1 on the original key A arranged along the first direction D1. The second clamp 50 is used for clamping the key blank B.

With reference to FIGS. 1 and 3, the cutting module 60 is pivotally mounted on the first sliding table 20, and has a swing table 61, a guiding element 62, a cutting element 63 and a motor 64.

With reference to FIGS. 3, 5 and 6, the swing table 61 is pivotally mounted on the first sliding table 20. An angular fixing hole 611 is formed in the swing table 61. In a preferred embodiment, the swing table 61 is pivotally mounted on the first sliding table 20 along a pivoting axis L1. The pivoting axis L1 is, but not limited to, parallel to a direction in which the second sliding table 12 moves sideways relative to the base 11. The guiding element 62 is fixed on the swing table 61, and protrudes from a side, which is directed towards the first direction, of the swing table 61. The cutting element 63 is rotatably mounted on the swing table 61, and protrudes from the side, which is directed towards the first direction D1, of the swing table 61.

Figure 7:
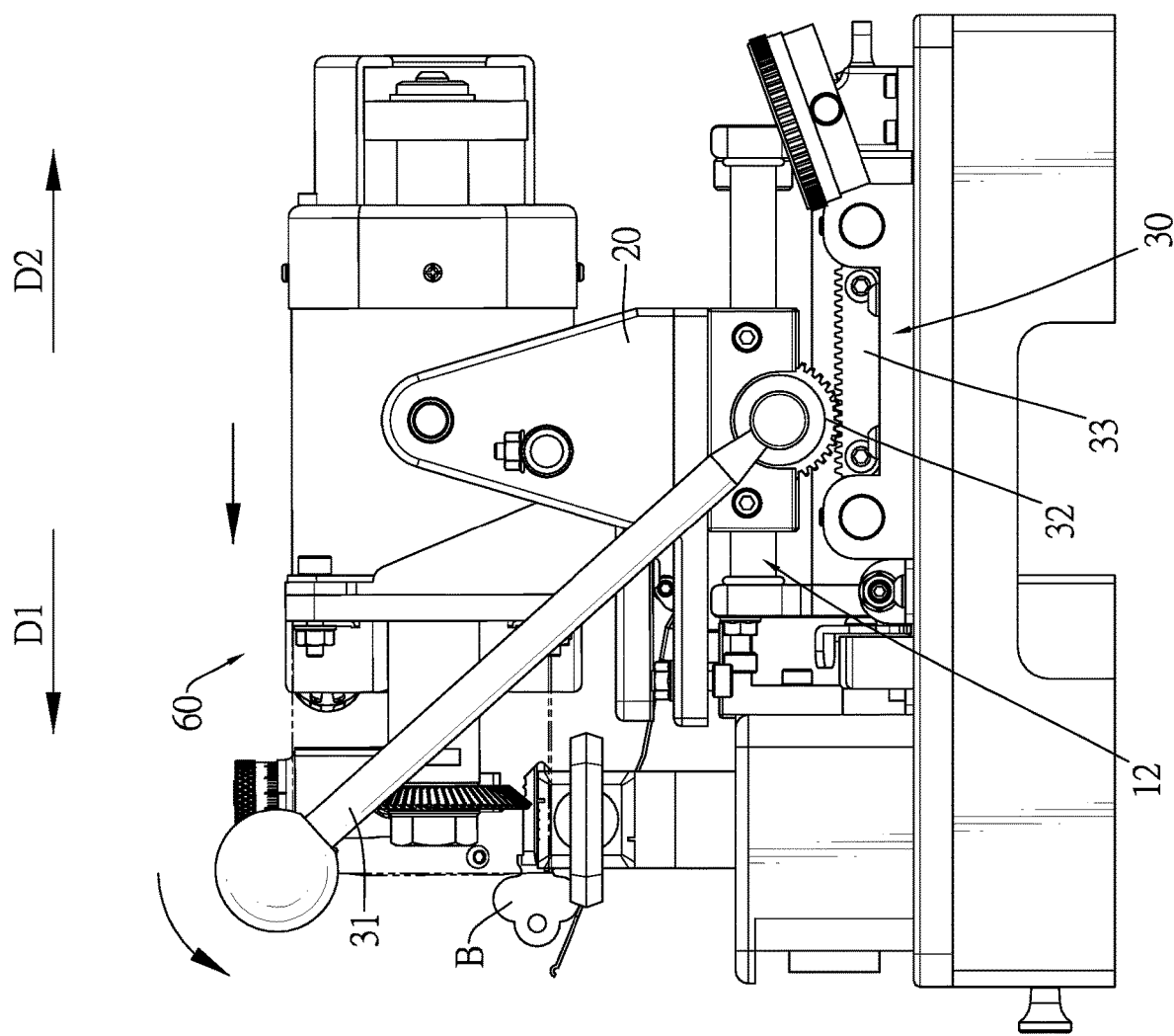
FIG. 7 is another side view of the key duplicating machine in FIG. 1, showing a different status of a first driving mechanism of the key duplicating machine.

With reference to FIGS. 5 to 7, the guiding element 62 and the cutting element 63 correspond in position to the original key A and the key blank B respectively, which means when the second sliding table 12, the first sliding table 20 and the swing table 61 are located in proper positions respectively, the guiding element 62 abuts against one of the notches A1 of the original key A, and meanwhile the cutting element 63 cuts the key blank B and duplicates the notch A1 to the key blank B. The motor 64 is fixed on the swing table 61, and drives the cutting element 63 to rotate.

Figure 22:
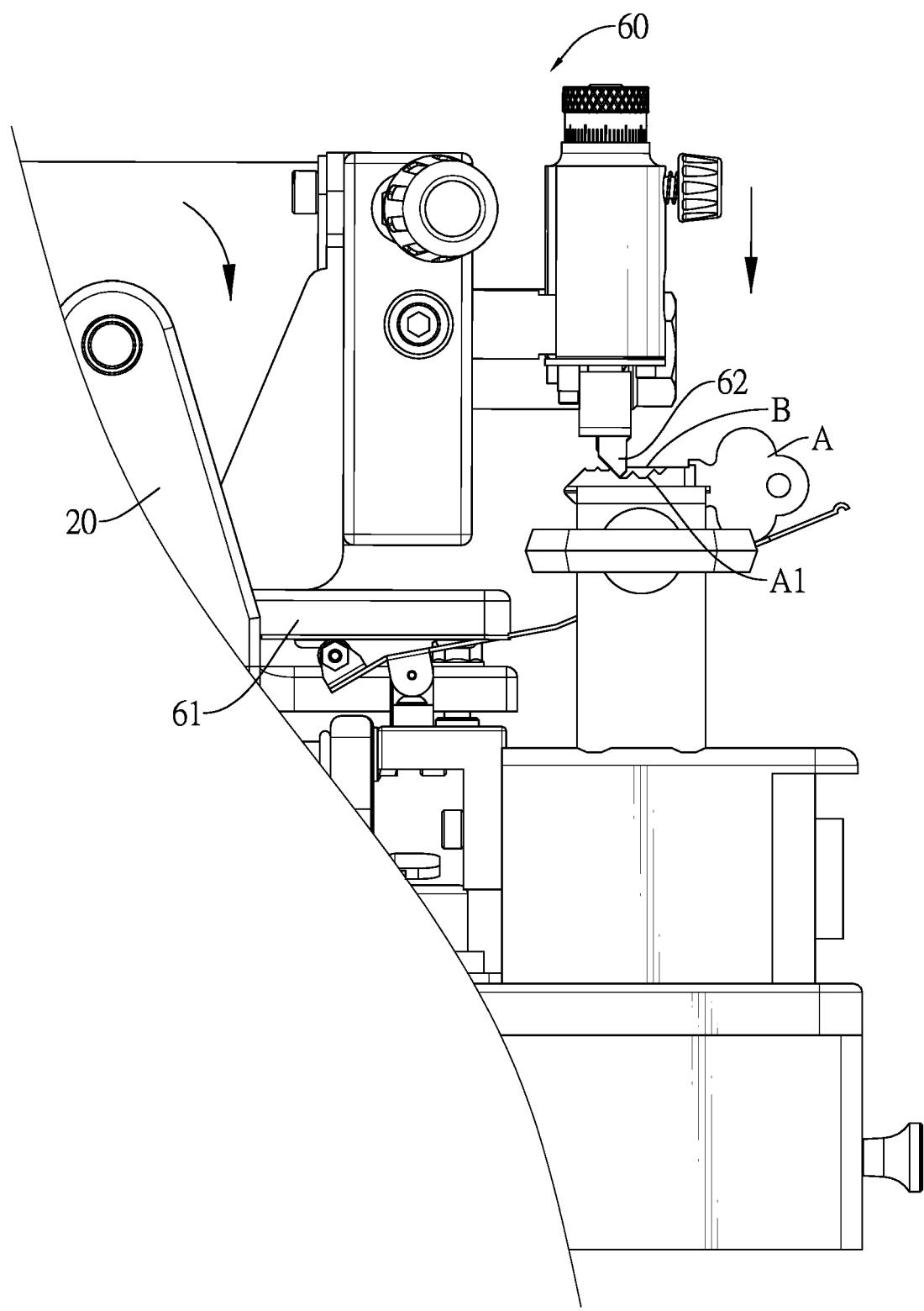
Figure 23:
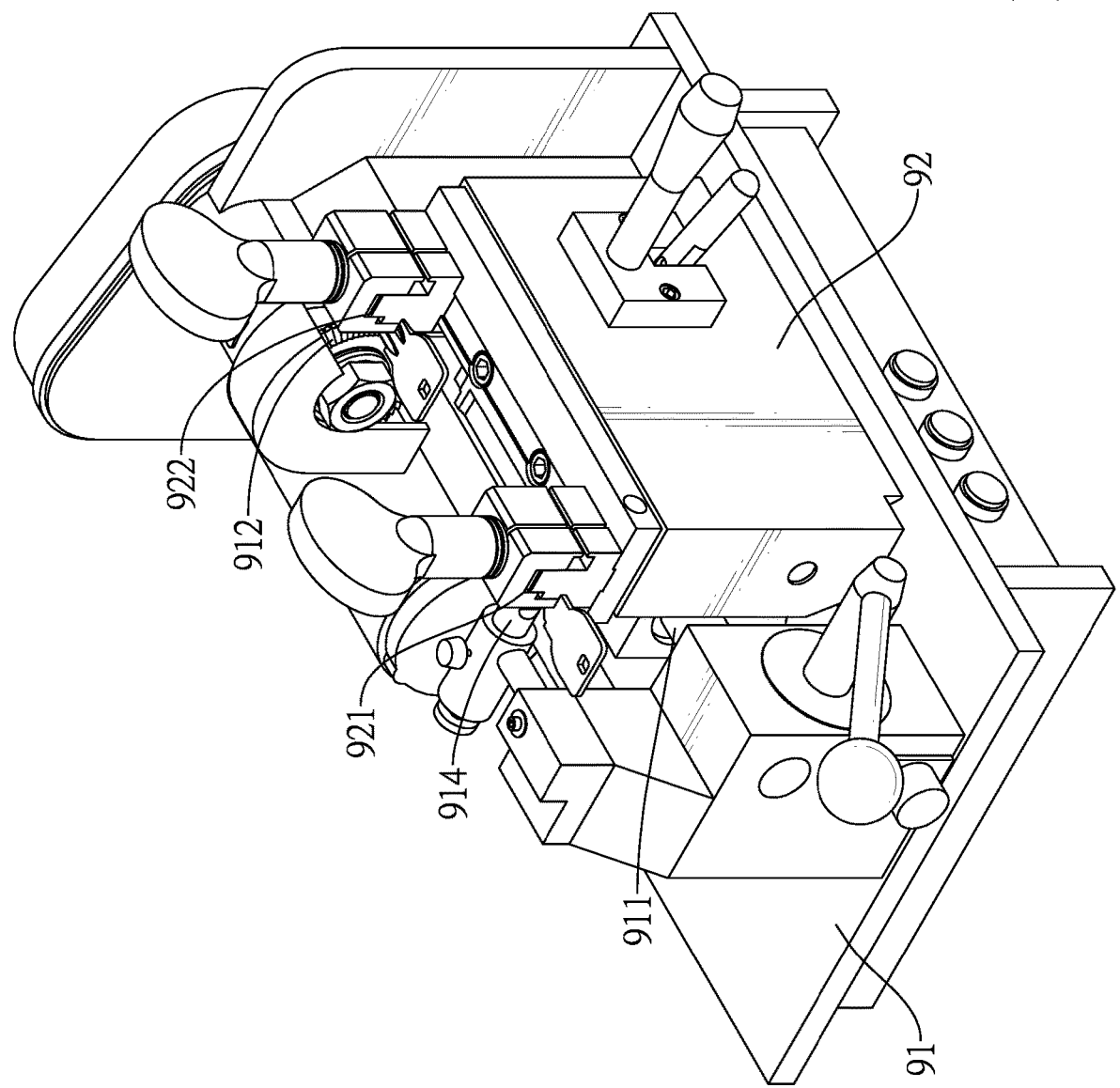
FIGS. 23 to 24 are perspective views of a conventional key duplicating machine in different operating statuses.
Figure 24:
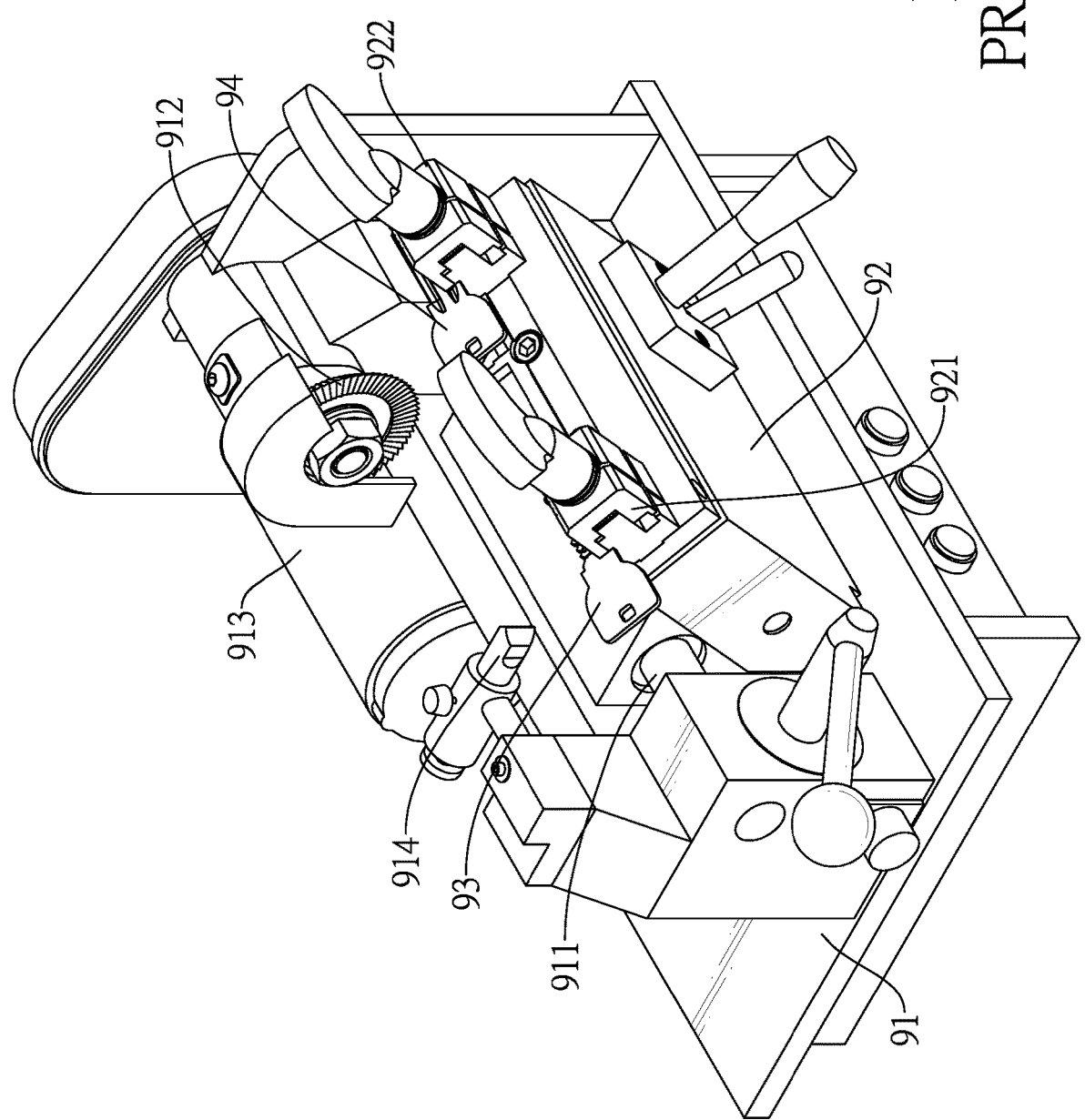

One of the major characteristics of the present invention is that a center of gravity of the cutting module 60 is located between the second clamp 50 and the pivoting axis L1 of the first sliding table 20. In a preferred embodiment, a line connecting between the first clamp 40 and the second clamp 50 is defined as a connecting line L2. The center of gravity of the cutting module 60 is located between the pivoting axis L1 and the connecting line L2. The center of gravity of the cutting module 60 makes the cutting module 60 rotate in a direction in which the guiding element 62 and the cutting element 63 move towards a top surface of the first sliding table 20, and thus the guiding element 62 selectively abuts against one of the notches A1 of the original key A (as shown in FIG. 22). In other words, the center of gravity of the cutting module 60 is deliberately located towards the positions of the first clamp 40 and the second clamp 50, which makes the cutting module 60 rotate due to gravity, and thus the guiding element 62 automatically abuts downwards against one of the notches A1 of the original key A. Meanwhile, a weight of the cutting module 60 makes the cutting element 63 press against the key blank B to cut the key blank B, and produces notches which correspond to the notches A1 of the original key A.

With reference to FIGS. 1, 3, 10 and 11, the angular fixing mechanism 70 is mounted between the cutting module 60 and the first sliding table 20, and is able to fix a relative angle between the cutting module 60 and the first sliding table 20. In a preferred embodiment, the angular fixing mechanism 70 has an angular fixing pin 71, a second positioning ball 72 and a second resilient element (not shown in the figures).

Figure 8:
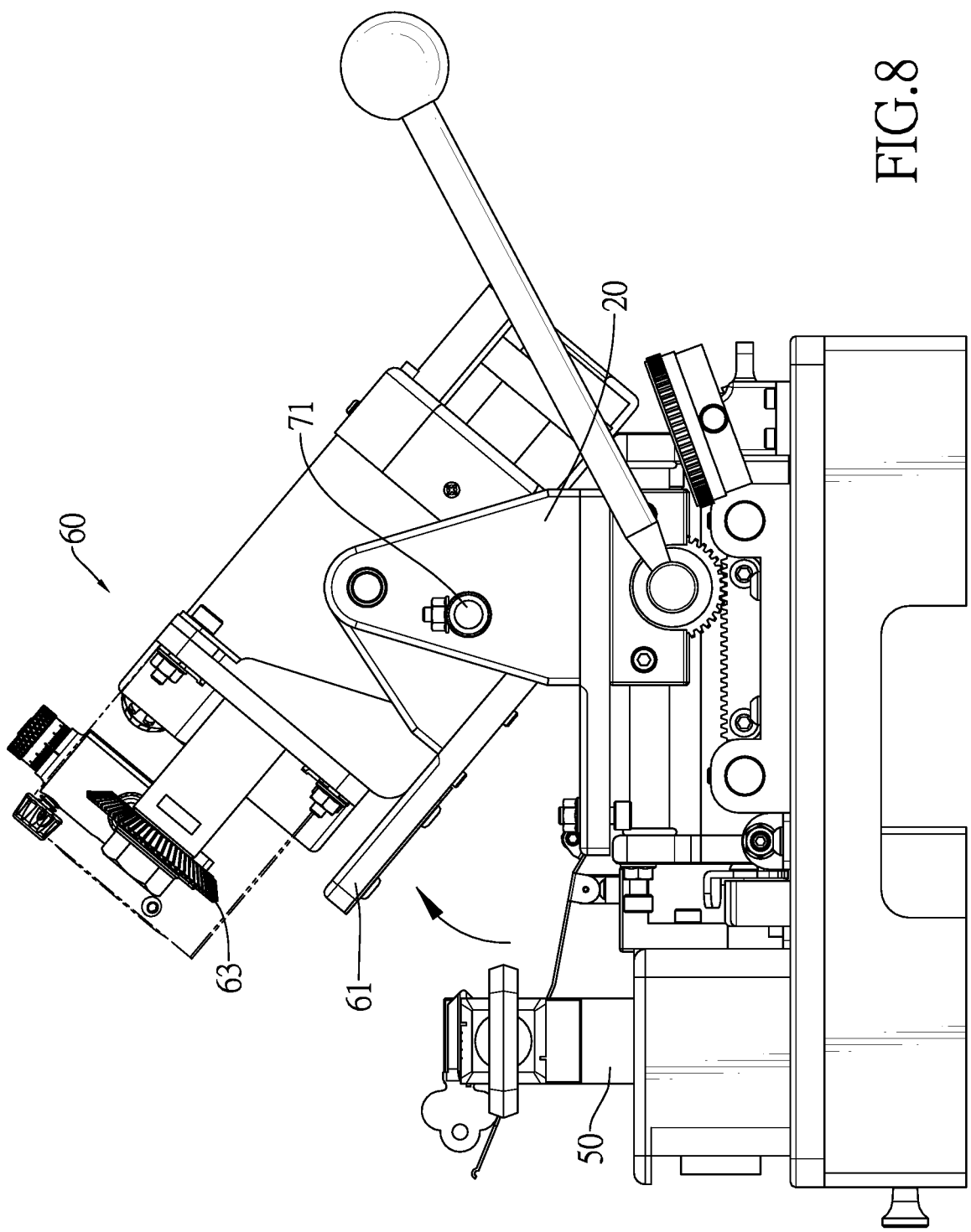
FIG. 8 is another side view of the key duplicating machine in FIG. 1, showing a different status of an angular fixing mechanism of the key duplicating machine.
Figure 9:
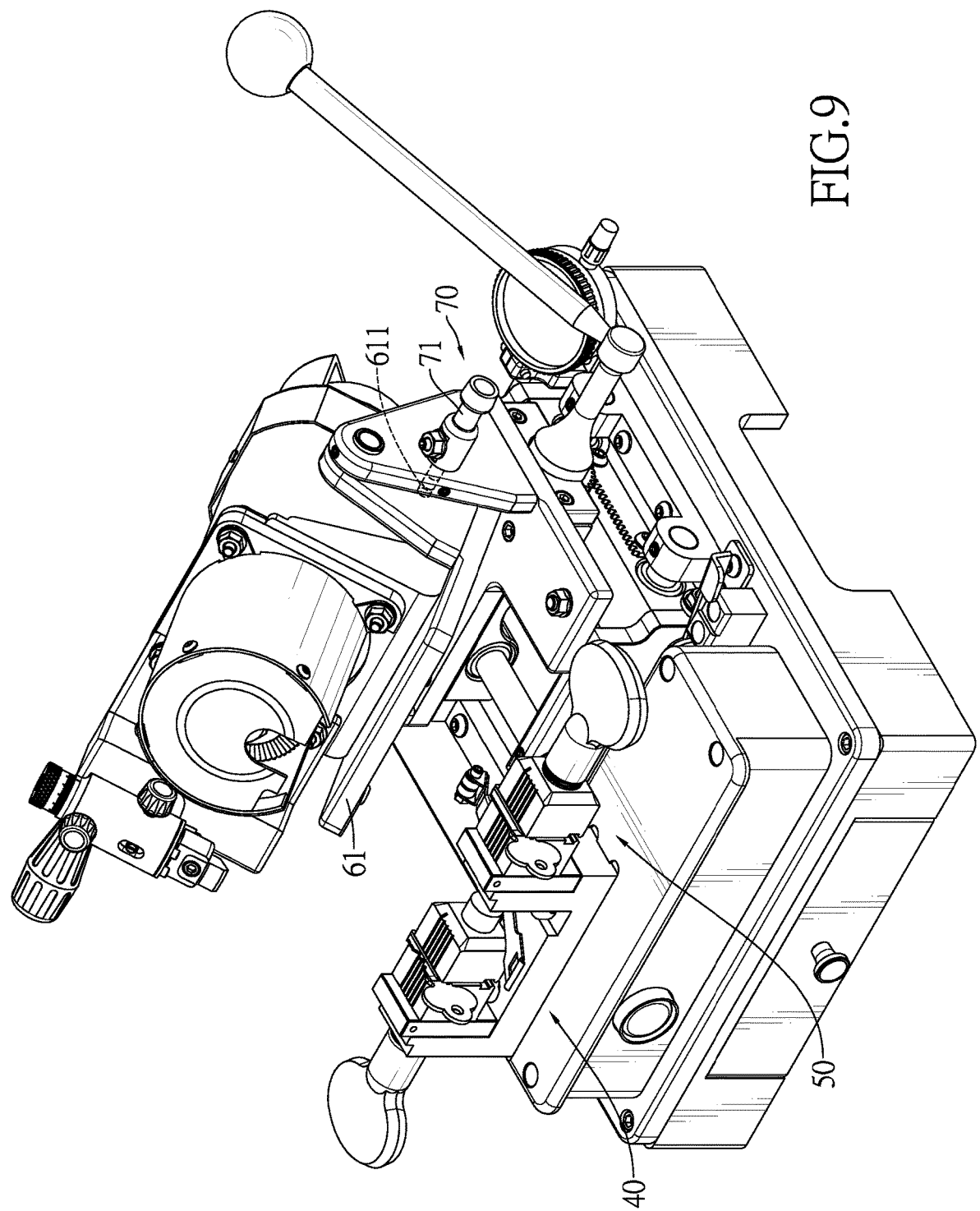
FIG. 9 is another perspective view of the key duplicating machine in FIG. 8.
Figure 10:
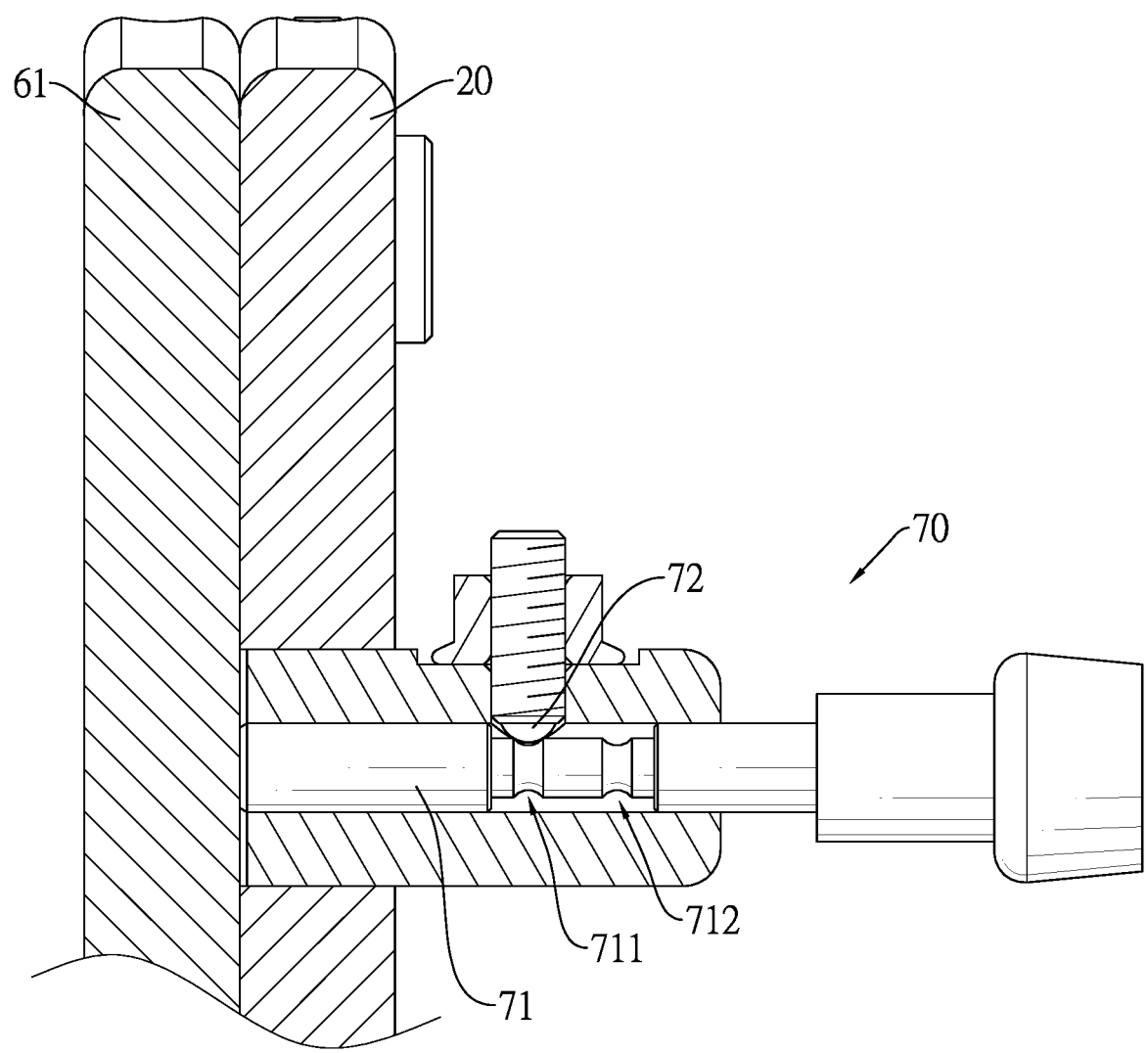
FIGS. 10 and 11 are sectional views in partial section of the key duplicating machine, showing different statuses of the angular fixing mechanism.
Figure 11:
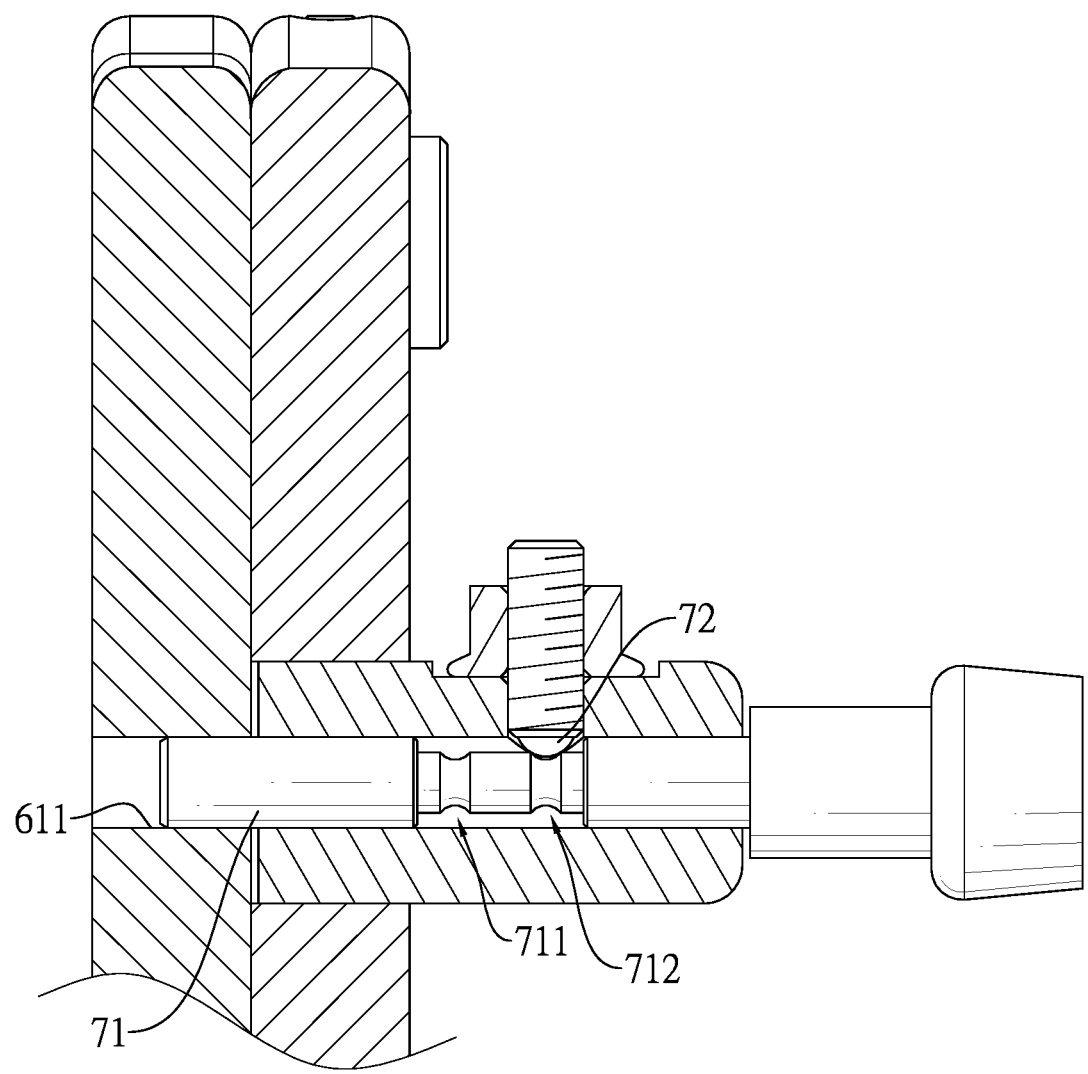

The angular fixing pin 71 is mounted through the first sliding table 20, and is able to further mount through the angular fixing hole 611 of the swing table 61 to fix the cutting module 60 in a raised position. When the cutting module 60 is fixed in the raised position (as shown in FIGS. 8 and 9), a position of the guiding element 62 is higher than a position of the first clamp 40, and a position of the cutting element 63 is higher than a position of the second clamp 50. After fixing the cutting module 60 in the raised position, the user can easily clean metal chips through a gap between the raised cutting module 60 and the first and second clamps.

A first annular groove 711 and a second annular groove 712 are formed in an annular surface on the angular fixing pin 71. The second positioning ball 72 is mounted in the swing table 61 of the cutting module 60. The second resilient element pushes the second positioning ball 72 towards the angular fixing pin 71. When the angular fixing pin 71 is mounted in the angular fixing hole 611, the second positioning ball 72 is mounted in the second annular groove 712 to prevent the angular fixing pin 71 from leaving the angular fixing hole 611, and thus prevents unexpected rotation of the cutting module 60. When the angular fixing pin 71 is not mounted in the angular fixing hole 611, the second positioning ball 72 is mounted in the first annular groove 711 to prevent the angular fixing pin 71 from coming off the swing table 61 when the user pulls the angular fixing pin 71.

With reference to FIGS. 3, 5, 12 and 13, the pry bar 80 is pivotally mounted on the base 11 of the base assembly 10, and two opposite ends of the ply bar 80 are a first end 81 and a second end 82, respectively. The first end 81 extends to a bottom of the swing table 61, and is located between the pivoting axis L1 of the cutting module 60 and the connecting line L2. The second end 82 is disposed proximal to a pivoting axis of the pry bar 80 relative to the first end 81. When the second end 82 is pushed downward by the user, the first end 81 abuts upward against the bottom of the swing table 61 to raise a height of the guiding element 62 and the cutting element 63.

Figure 20:
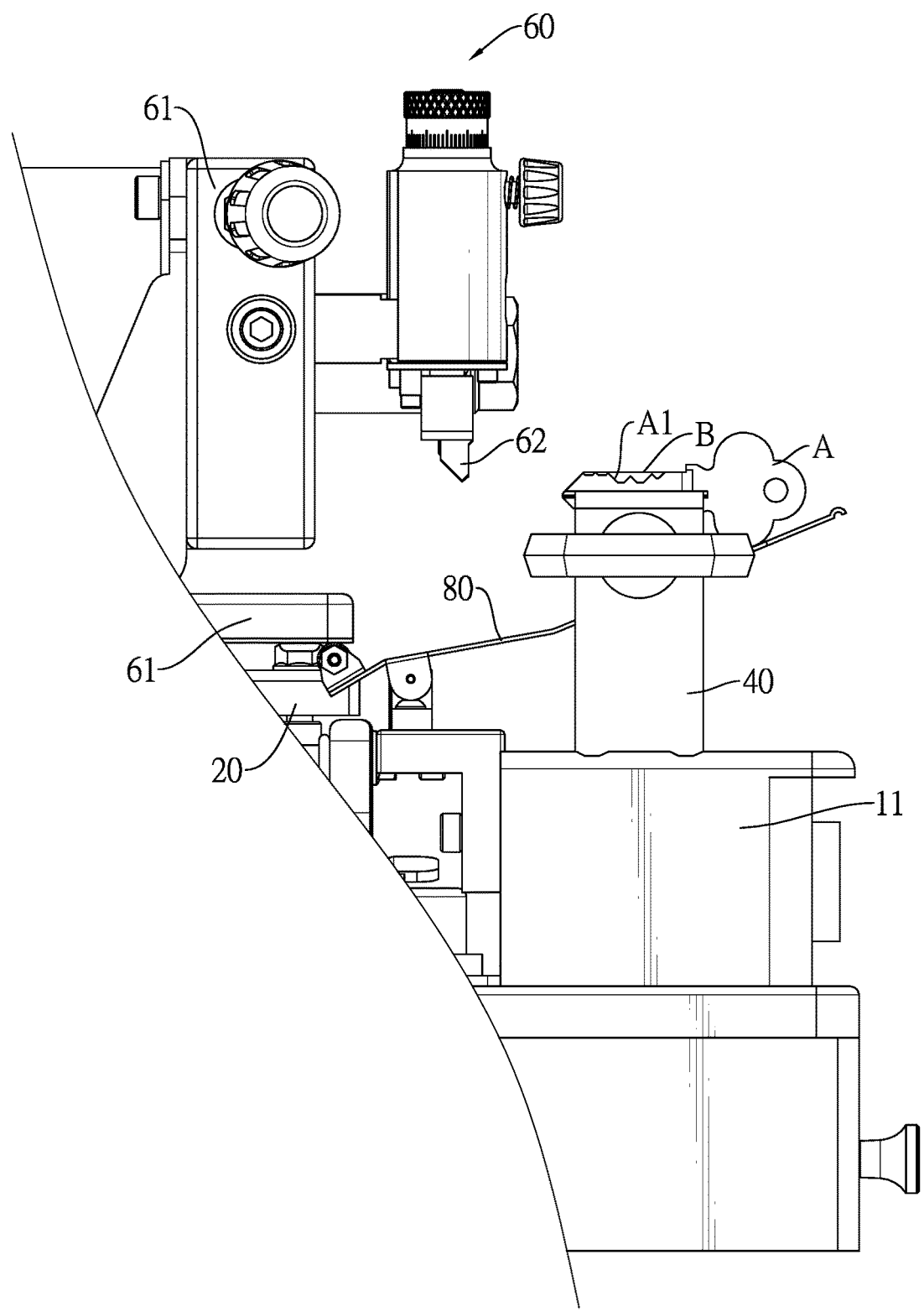
FIGS. 20 to 22 are side views in partial section of the key duplicating machine in FIG. 1, showing different operating statuses of the present invention.
Figure 21:
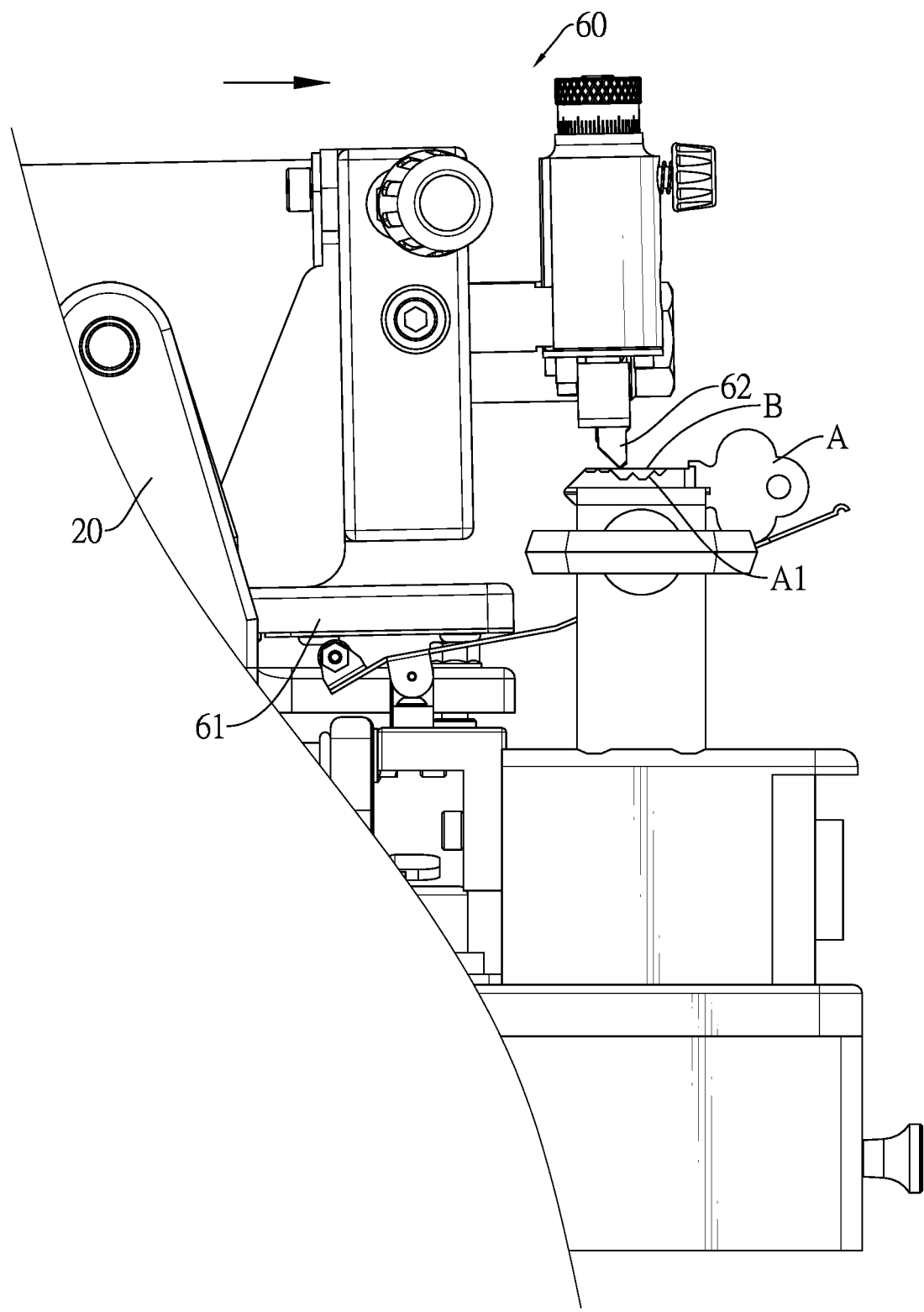

With reference to FIGS. 6, 7 and 20 to 22, when using the present invention, clamp the original key A with the first clamp 40 and keep the notches A1 facing upwards. Clamp the key blank B with the second clamp 50 (as shown in FIGS. 6 and 20), and then pull the first manual operating part 31 along the first direction D1 to make the first sliding table 20 move along the first direction D1. The cutting module 60 moves together with the first sliding table 20 along the first direction D1 (as shown in FIG. 7). When the guiding element 62 and the cutting element 63 are located above the original key A and the key blank B (as shown in FIG. 21), the weight of the cutting module 60 makes the cutting element 63 rotate towards the top of the first sliding table 20 to cut the key blank B downward until the tip of the guiding element 62 abuts against one of the notches A1 of the original key A (as shown in FIG. 22) to duplicate one of the notches A1. The user then keeps pulling the first manual operating part 31 along the first direction D1 to complete duplication of all the notches A1 of the original key A to the key blank B. Key duplication takes less than four seconds.

Although the notches A1 of most keys are arranged along the first direction D1 and arranged in one straight line, the notches of some special keys are arranged in two paralleled straight lines respectively, and the two straight lines are spaced apart along the pivoting axis L1. In order to duplicate the special keys correctly, the position of the guiding element 62 and the cutting element 63 needs to be adjusted along the pivoting axis L1 to align the center of the guiding element 62 with the center of each notch A1. If said centers are not aligned, the tip of the guiding element 62 cannot abut against bottoms of the notches A1, which results in failed duplication.

When the present invention is used for duplication said special original key A, the position of the second sliding table 12 needs to be adjusted accurately to align the center of the guiding element 62 with the center of each notch A1, and the adjustment is carried out by operating the second manual operating part 131 according to measurement of the distance indicator 15. Additionally, most of the special keys have two rows of notches disposed 0.6 millimeter apart from each other, and therefore in a preferred embodiment, the two stopping positions of the switching mechanism 14 are disposed 0.6 millimeter apart from each other, and each stopping position corresponds to the center of each row. As a result, the switching mechanism 14 can be used for fast center alignment between the guiding element 62 and the notches A1, and the adjustment according to the measurement of the distance indicator 15 can be omitted, which accelerates the duplication process.

Figure 12:
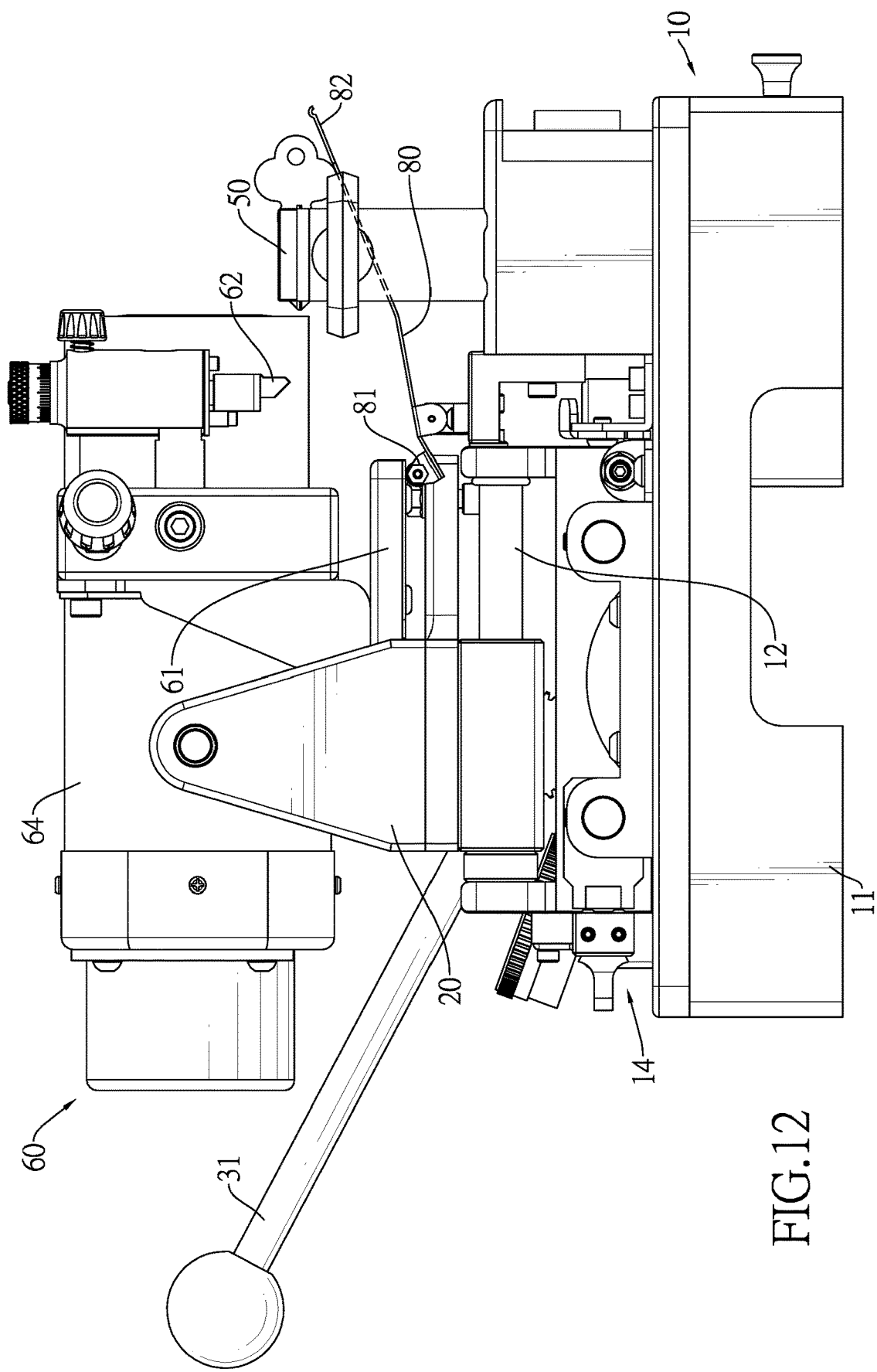
FIGS. 12 and 13 are side views of the key duplicating machine in FIG. 1, showing different statuses of a pry bar of the key duplicating machine.
Figure 13:
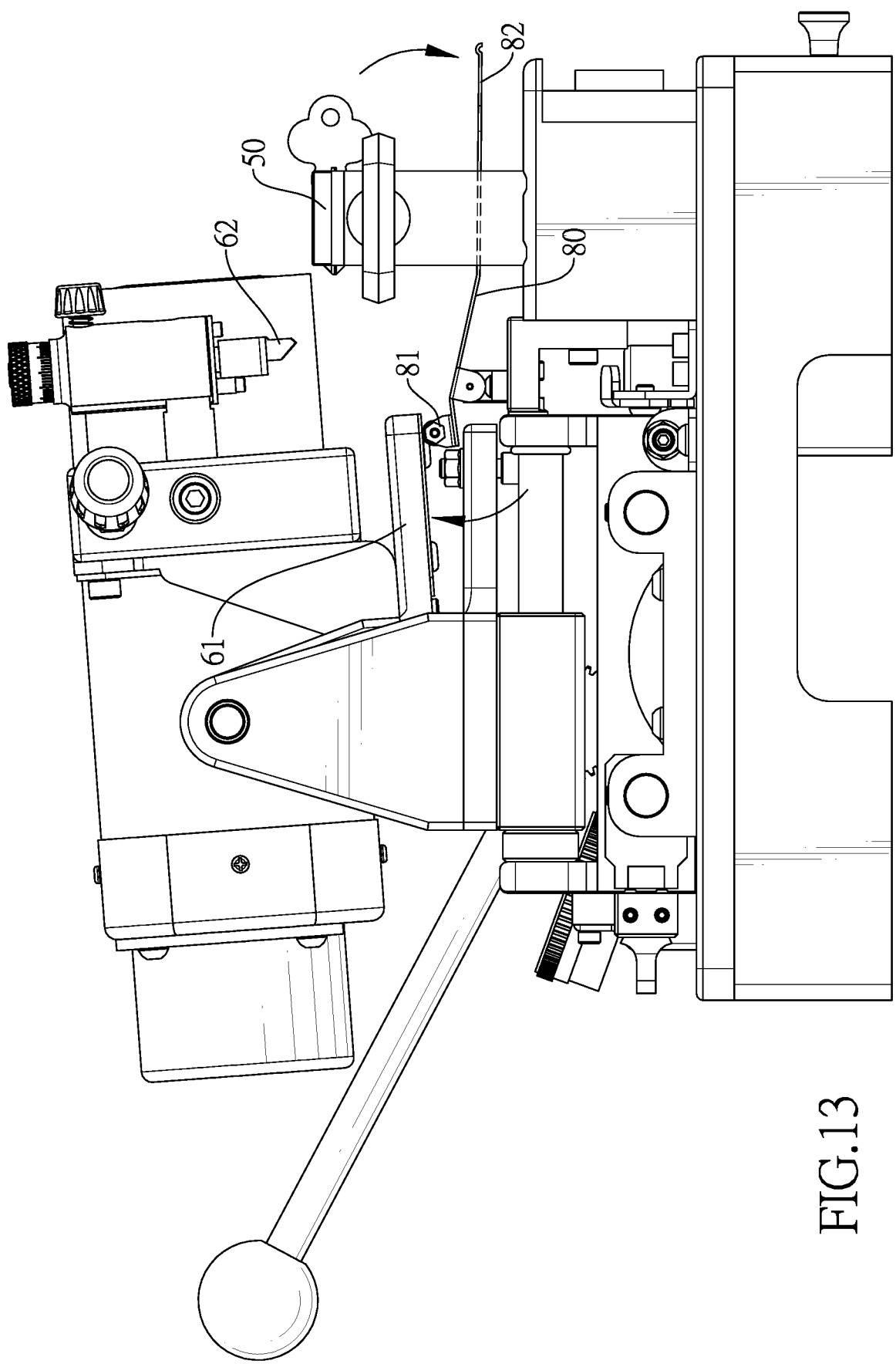
Figure 14:
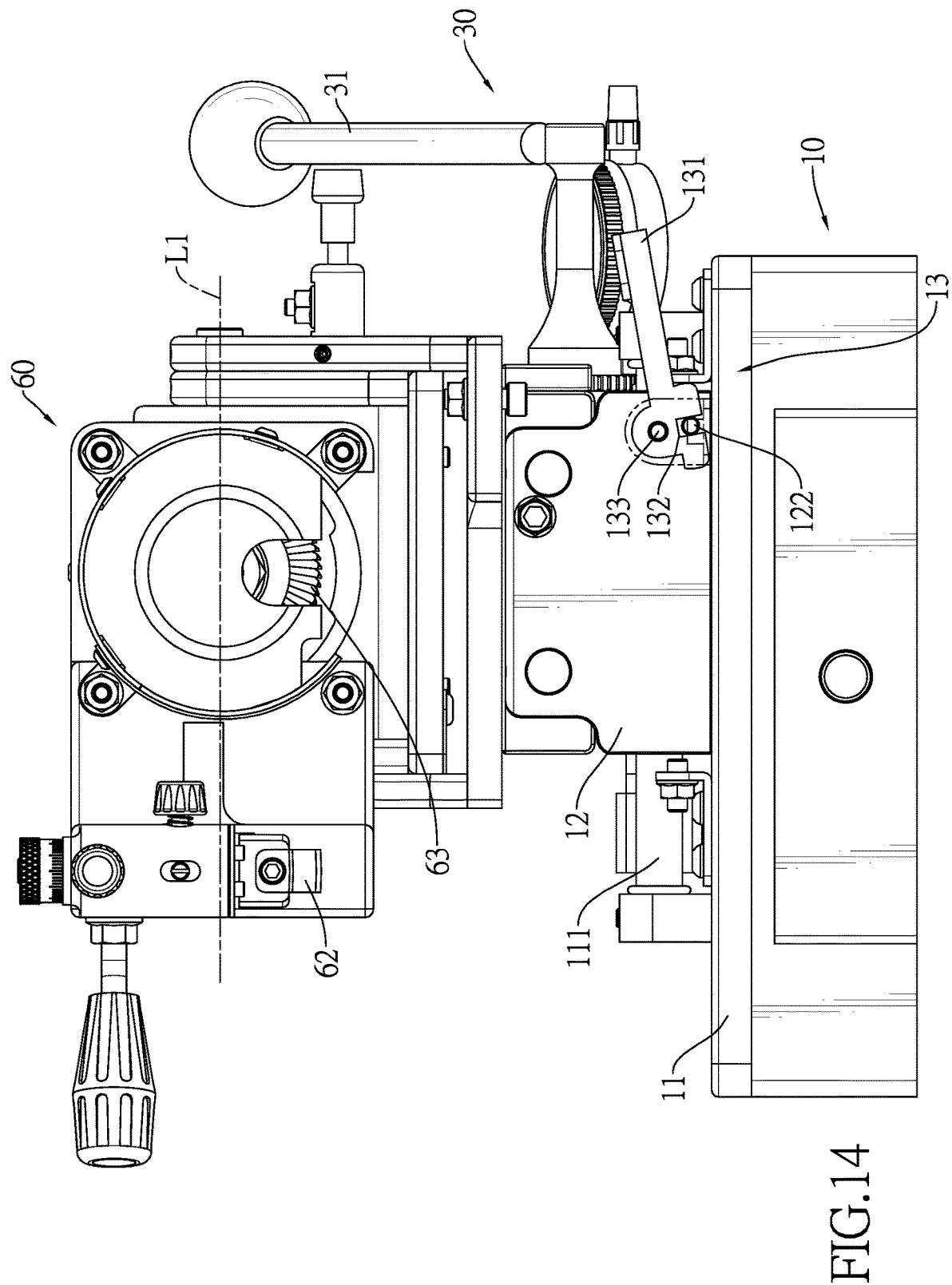
FIGS. 14 and 15 are front views of part of the components of the key duplicating machine in FIG. 1, showing different statuses of a second driving mechanism of the key duplicating machine.
Figure 15:
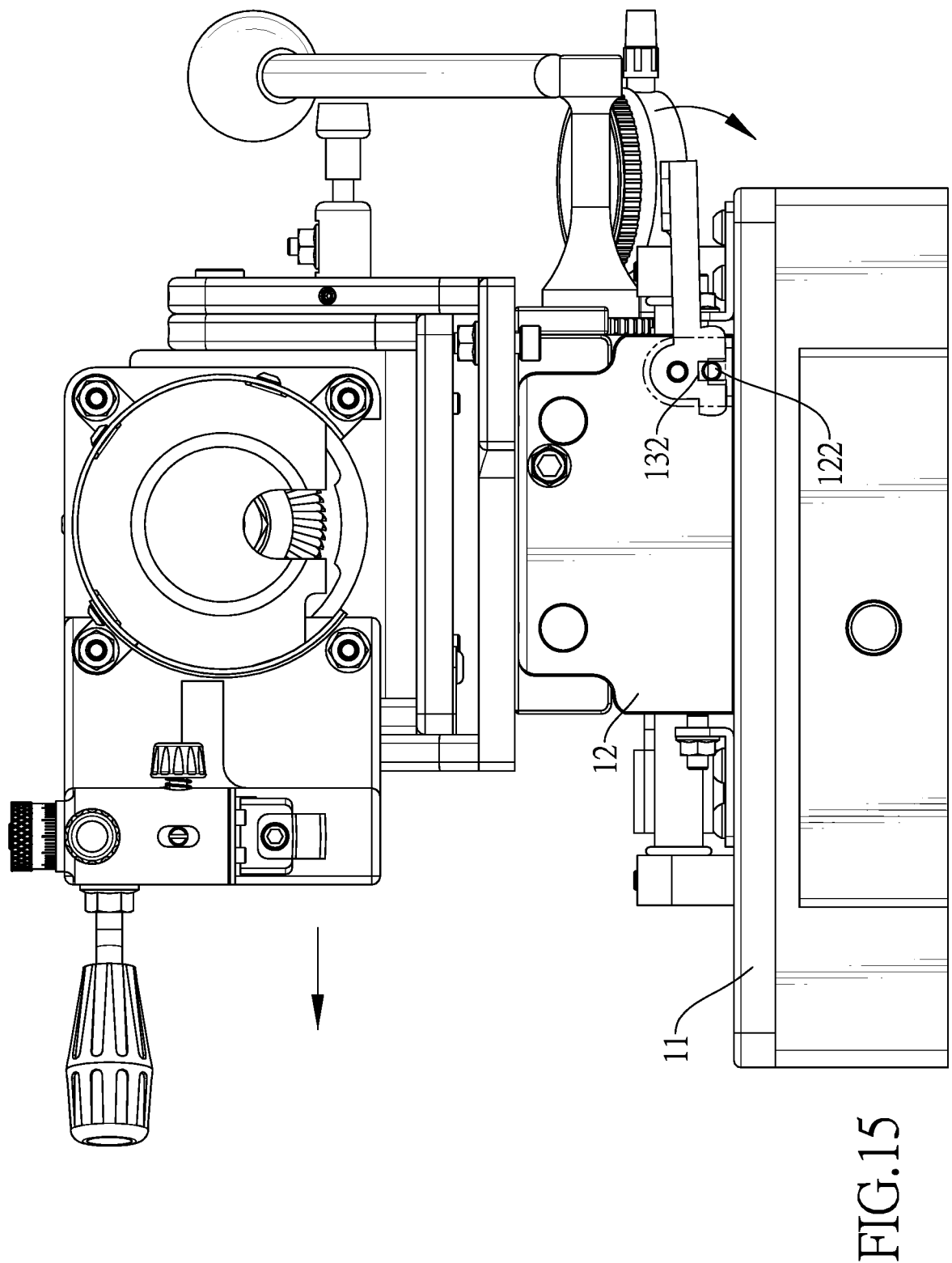

With reference to FIGS. 12 and 13, before cutting the key blank B, the height of the guiding element 62 can be controlled accurately by the pry bar 80 to detect shapes of the notches A1 of the original key A.

In summary, the two clamps used for clamping keys are fixed on the base assembly. The first sliding table is slidably mounted on the base assembly. The cutting module is pivotally mounted on the first sliding table and the center of gravity of the cutting module is located towards the clamps, so that the weight of the cutting module presses against the key. Precision of the key duplication is improved, and it is easier to duplicate a key.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A key duplicating machine, the key duplicating machine for duplicating notches of an original key to a key blank and comprising:
    a base assembly having:
        a base;
        a first direction; and
        a second direction opposite to the first direction;
    a first clamp fixed on the base of the base assembly; the first clamp used for clamping the original key; the notches of the original key extending in the first direction of the base assembly;
    a second clamp fixed on the base of the base assembly, and disposed apart from the first clamp; the second clamp used for clamping the key blank;
    a second sliding table slidably mounted on the base, and the second sliding table being movable relative to the base in a direction perpendicular to the first direction and the second direction;
    a second driving mechanism mounted between the base and the second sliding table, and the second driving mechanism driving the second sliding table to move relative to the base; the second driving mechanism having:
        a second manual operating part being a lever pivotally mounted on the base; a drive slot formed in one end of the lever; and
        a dowel pin protruding from a side of the second sliding table; the dowel pin extending in the first direction from the side of the sliding table, and slidably mounted in the drive slot; wherein a position of the second sliding table relative to the base is determined by a pivoting angle of the lever;
    a first sliding table slidably mounted on the second sliding table, and being movable along the first direction or the second direction relative to the second sliding table; the first sliding table is located next to the first clamp and the second clamp;
    a first driving mechanism mounted between the base assembly and the first sliding table; the first driving mechanism driving the first sliding table to move along the first direction or the second direction relative to the base assembly; and the first driving mechanism having a first manual operating part;
    a cutting module pivotally mounted on the first sliding table, and having:
        a swing table pivotally mounted on the first sliding table;
        a guiding element fixed on the swing table, the guiding element protruding from a side of the swing table facing in the first direction; the guiding element corresponding in position to the original key;
        a cutting element rotatably mounted on the swing table, the cutting element protruding from the side of the swing table facing in the first direction; a rotational axis of the cutting element extending parallel to each of the first and second directions; the cutting element corresponding in position to the key blank; and
        a motor fixed on the swing table and driving the cutting element to rotate;
    wherein a center of gravity of the cutting module is located between the second clamp and a pivoting axis of the cutting module, such that the cutting module rotates in a direction in which the guiding element and the cutting element move towards a top surface of the first sliding table, thereby the guiding element selectively abutting against one of the notches of the original key; wherein when the guiding element abuts against one of the notches of the original key, the cutting element cuts the key blank.

2. The key duplicating machine as claimed in claim 1, wherein the base assembly further has:
    a switching mechanism mounted between the base and the second slicing table, and the switching mechanism having:
        a fixed block mounted on the base; two positioning recesses formed in the fixed block;
        a switching block mounted on the second sliding table; two mounting holes formed in the switching block; a distance between the two mounting holes along the direction perpendicular to the first direction and the second direction is different from a distance between the two positioning recesses along the direction perpendicular to the first direction and the second direction;
        two first positioning balls; each of the two first positioning balls mounted in a respective one of the two mounting holes, and each of the two first positioning balls corresponding in position to a respective one of the two positioning recesses; and
        two first resilient elements; each of the two first resilient elements mounted in a respective one of the two mounting holes, and each of the two first resilient elements pushing a respective one of the two first positioning balls towards the respective one of the two positioning recesses;
    wherein one of the two first positioning balls is selectively mounted in one of the two positioning recesses.

3. The key duplicating machine as claimed in claim 1, wherein the base assembly further has:
   a distance indicator mounted on the base for measuring a displacement of the second sliding table relative to the base.

4. The key duplicating machine as claimed in claim 1, wherein
   the first manual operating part of the first driving mechanism is a rod; the rod is pivotally mounted on the first sliding table;
   the first driving mechanism further has:
      a gear rack fixed on the second sliding table of the base assembly; and
      a gear fixed on the first manual operating part, and engaged with the gear rack;
   wherein a position of the first sliding table relative to the base assembly is determined by a pivoting angle of the rod.

5. The key duplicating machine as claimed in claim 1, wherein the key duplicating machine further comprises an angular fixing mechanism mounted between the cutting module and the first sliding table, and selectively fixing a relative angle between the cutting module and the first sliding table.

6. The key duplicating machine as claimed in claim 5, wherein
   an angular fixing hole is formed in the swing table of the cutting module;
   the angular fixing mechanism has:
      an angular fixing pin mounted through the first sliding table, and selectively mounted in the angular fixing hole; wherein when the angular fixing pin is mounted through the angular fixing hole, a position of the guiding element is higher, relative to a bottom of the base, than a position of the first clamp, and a position of the cutting element is higher, relative to the bottom of the base, than a position of the second clamp;
   the annular fixing pin has:
      two annular grooves formed in an annular surface on the angular fixing pin;
   the angular fixing mechanism further has a positioning ball mounted in the swing table, and the positioning ball is mounted in one of the two annular grooves.

7. The key duplicating machine as claimed in claim 1, wherein the key duplicating machine further comprises
   a pry bar pivotally mounted on the base of the base assembly and having;
      a first end located at one end of the pry bar, and the first end extending to a bottom of the swing table; the first end located between the pivoting axis of the cutting module and a connecting line connecting between the first clamp and the second clamp; and
      a second end located opposite to the first end of the pry bar; wherein when the second end is pushed downward, the first end abuts upward against the bottom of the swing table.

\* \* \* \* \*